(12) United States Patent
Ono

(10) Patent No.: US 7,248,300 B1
(45) Date of Patent: Jul. 24, 2007

(54) CAMERA AND METHOD OF PHOTOGRAPHING GOOD IMAGE

(75) Inventor: Shuji Ono, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 749 days.

(21) Appl. No.: 09/586,600

(22) Filed: Jun. 2, 2000

(30) Foreign Application Priority Data

| Jun. 3, 1999 | (JP) | ................................. 11-157159 |
| Jun. 4, 1999 | (JP) | ................................. 11-158666 |

(51) Int. Cl.
  *H04N 5/222* (2006.01)
  *H04N 5/225* (2006.01)
  *G06K 9/00* (2006.01)

(52) U.S. Cl. ........................... 348/333.03; 348/207.99; 382/117

(58) Field of Classification Search ................ 348/345, 348/208.12, 239
   See application file for complete search history.

(56) References Cited

U.S. PATENT DOCUMENTS

| 4,445,767 | A | * | 5/1984 | Kawazoe ..................... 396/89 |
| 4,881,127 | A | * | 11/1989 | Isoguchi et al. ............ 348/296 |
| 5,619,264 | A | * | 4/1997 | Yoshimura et al. ......... 348/352 |
| 5,946,506 | A | * | 8/1999 | Uematsu ..................... 396/177 |
| 6,351,286 | B1 | * | 2/2002 | Ikami et al. ................ 348/362 |
| 6,539,100 | B1 | * | 3/2003 | Amir et al. .................. 382/117 |
| 6,606,117 | B1 | * | 8/2003 | Windle ....................... 348/239 |

FOREIGN PATENT DOCUMENTS

| JP | 4156526 | 5/1992 |
| JP | 5037940 | 2/1993 |
| JP | 5040303 | 2/1993 |
| JP | 5100148 | 4/1993 |
| JP | 7295085 | 11/1995 |
| JP | 8251475 | 9/1996 |
| JP | 9005815 | 1/1997 |
| JP | 9181866 | 7/1997 |
| JP | 9212620 | 8/1997 |
| JP | 10023319 | 1/1998 |
| JP | 10191216 | 7/1998 |
| JP | 11014512 | 2/1999 |
| JP | 11122526 | 4/1999 |

* cited by examiner

*Primary Examiner*—James J. Groody
*Assistant Examiner*—Heather R. Jones
(74) *Attorney, Agent, or Firm*—Birch, Stewart, Kolasch & Birch, LLP

(57) ABSTRACT

A camera includes a release button, an input unit, an A/D converter, a memory, a control unit, an alarm, a recording unit and an output unit. The memory stores data for the image converted by the A/D converter. The control unit judges whether or not the image stored in the memory satisfies a predetermined photographing condition and outputs a timing signal when the image satisfies the photographing condition. The alarm outputs an alarm signal to a photographer. The recording unit records the refined image on a recording medium. The output unit outputs the refined image.

17 Claims, 23 Drawing Sheets

CAMERA AND METHOD OF PHOTOGRAPHING GOOD IMAGE

This patent application claims priority based on a Japanese patent applications, H11-157159 filed on Jun. 3, 1999, and H11-158666 filed on Jun. 4, 1999, the contents of which are incorporated herein by reference.

BACKGROUND OF THE INVENTION

1. Field of the Invention

The present invention relates to a camera, and more particularly to a camera capable of automatically photographing an image of a subject when the subject satisfies a predetermined photographing condition.

2. Description of the Related Art

Conventionally, a technique is known to correct a photograph so that a person photographed by a camera can be satisfied with the result. However, this technique requires a high degree of skill. Furthermore, it is difficult to correct a person's face in the photograph when he or she is blinking or is not smiling, to a face as if he or she is not blinking or is smiling.

On the other hand, Japanese Patent Laid-open Publication (Kokai) H9-212620 and Japanese Patent Laid-open Publication (Kokai) H10-191216 disclose a technique to continuously photograph a plurality of images. Those images are displayed, and the person photographed by the camera can select a desirable image from among those images.

Japanese Patent Laid-open Publication (Kokai) H5-40303, H4-156526 and H5-100148 disclose cameras which can automatically judge the timing for photographing images.

However, this was troublesome because the photographed person or the photographer needed to select the desired image by checking all of the images. Furthermore, when a lot of people are photographed in the image, it is more difficult to select an image that all of them are satisfied with.

Furthermore, images are photographed at the timing when the photographer judges it is the best timing. Therefore, the photographers timing is not always matched with the best timing for the photographed person. In addition, when a lot of people are photographed in the image, it is more difficult to judge the best timing at which many of them will be satisfied with the image.

SUMMARY OF THE INVENTION

Therefore, it is an object of the present invention to provide a camera which overcomes the above issues in the related art. This object is achieved by combinations described in the independent claims. The dependent claims define further advantageous and exemplary combinations of the present invention.

According to the first aspect of the present invention, a camera comprises: an image data input unit forming an image of a subject for photographing said subject; a condition storing unit storing a predetermined photographing condition related to a desirable subject; and a timing signal generator outputting a timing signal when said subject satisfies said photographing condition.

The camera may include an extractor extracting data of an aimed object from said image of said subject based on an extracting condition, wherein said photographing condition may include a predetermined condition related to a desirable aimed object and said timing signal generator outputs said timing signal when said aimed object satisfies said photographing condition.

The extracting condition may be based on depth information of said image indicating the distance to each part of said subject.

The extractor may detect data of a judgement location from said data of said aimed object in said image based on a detecting condition different from said extracting condition, said photographing condition may include a predetermined photographing condition related to a desirable judgement location, and the timing signal generator may output said timing signal when said judgement location satisfies said photographing condition.

The extractor may extract data of a plurality of said aimed objects from said image; and said timing signal generator may output said timing signal when said plurality of aimed objects satisfy said photographing condition.

The timing signal generator may output said timing signal when the ratio of said aimed objects satisfying said photographing condition against all of said plurality of said aimed object exceeds a predetermined ratio.

The extractor may detect data of a plurality of judgement locations from each of said data of said plurality of aimed objects based on a detecting condition different from said first condition, said photographing condition may include a predetermined photographing condition related to said judgement location, and said timing signal generator may output said timing signal when said plurality of said judgement locations satisfy said photographing condition.

The timing signal generator may output said timing signal when the ratio of said judgement locations satisfying said photographing condition against all of said plurality of said aimed object exceeds a predetermined ratio.

The camera may include an image-pickup control unit controlling said input unit for photographing said image based on said timing signal.

The camera may include an illuminator illuminating said subject based on said timing signal.

The camera may include a recording unit recording said image on a replaceable nonvolatile recording medium based on said timing signal.

The camera may include an alarm outputting an alarm signal for notifying that said subject satisfies said photographing condition based on said timing signal.

The photographing condition may include a plurality of photographing conditions, and said camera may include a condition-setting unit previously selecting at least one of said photographing conditions, for photographing said image, from among said plurality of photographing conditions.

The camera may include: an input condition determining unit determining an input condition for inputting said image based on information of said judgement location detected by said extractor; and an image-forming control unit controlling an input unit for forming said image of said subject based on said input condition.

The camera as set forth in claim may include an image processing unit processing said image based on information of said judgement location detected by said extractor.

According to the second aspect of the present invention, a camera comprises: an image data input unit forming a plurality of images of a subject for photographing said subject; a condition storing unit storing a predetermined photographing condition related to a desirable variation of said subject; a variation detector detecting variation of said subject in said plurality of said images based on information of said plurality of images; and a timing signal generator outputting a timing signal when said variation of said subject satisfies said photographing condition.

The camera may include: an extractor extracting data of an aimed object from each of said plurality of images of said subject based on an extracting condition, wherein said photographing condition may include a predetermined condition related to a desirable aimed object, said variation detector may detect variation of said aimed object in said plurality of images based on said information of said plurality of images, and said timing signal generator may output said timing signal when said variation of said aimed object satisfies said photographing condition.

The extracting condition may be based on depth information of said plurality of images indicating the distance to each part of said subject.

The extractor may detect data of a judgement location from said data of said aimed object in each of said plurality of images based on a detecting condition different from said extracting condition, said photographing condition may include a predetermined photographing condition related to a desirable judgement location, said variation detector may detect variation of said judgement location in said plurality of images based on said information of said plurality of images, and said timing signal generator may output said timing signal when said variation of said judgement location satisfies said photographing condition.

The photographing condition may include a predetermined starting condition for starting detection of said variation of said judgement location, and said variation detector may start detecting said variation of said judgement location when said judgement location satisfies said starting condition.

The extractor may extract data of a plurality of said aimed objects from each of said plurality of images, said variation detector may detect variation of each of said plurality of said aimed objects in said plurality of images based on information of said plurality of images, and said timing signal generator may output said timing signal when said variation of said plurality of said aimed objects satisfy said photographing condition.

The extractor may detect data of a plurality of judgement locations from each of said data of said plurality of aimed objects based on a detecting condition different from said extracting condition, said photographing condition may include a predetermined photographing condition related to desirable variation of said judgement location, said variation detector may detect variation of each of said plurality of said judgement locations in said plurality of images based on information of said plurality of images, and said timing signal generator may output said timing signal when said variation of said plurality of said judgement locations satisfy said photographing condition.

The camera may include an image pickup control unit controlling said input unit for photographing said image based on said timing signal.

The camera may include an illuminator illuminating said subject based on said timing signal.

The camera may include a recording unit recording said image on a replaceable nonvolatile recording medium based on said timing signal.

The camera may include an alarm outputting an alarm signal for notifying that said subject satisfies said photographing condition based on said timing signal.

The photographing condition may include a plurality of photographing conditions, and said camera may include a condition-setting unit previously selecting at least one of said photographing conditions for photographing said image, from among said plurality of photographing conditions.

The timing signal generator may select said judgement location satisfying said photographing condition from among said plurality of said judgement locations in said plurality of images, and outputs information for said aimed object including said judgement location, and the camera may include: an input condition determining unit determining an input condition for inputting said image based on information for said judgement location; and an image forming control unit controlling an input unit for forming said image of said subject based on said input condition.

The timing signal generator may select said judgement location satisfying said photographing condition from among said plurality of said judgement locations in said plurality of images, and outputs information for said aimed object including said judgement location, and said camera may include an image processing unit processing said image based on said information for said judgement location.

According to the third aspect of the present invention, a method of photographing an image of a subject comprises outputting a timing signal when said subject satisfies a predetermined photographing condition.

The method may include: extracting data of an aimed object from said image of said subject based on an extracting condition, wherein said photographing condition may include a predetermined condition related to a desirable aimed object, and said timing signal may be output when said aimed object satisfies said photographing condition.

The extracting may include detecting data of a judgement location from said data of said aimed object in said image based on a detecting condition different from said extracting condition, said photographing condition may include a predetermined photographing condition related to a desirable judgement location, and said timing signal may be output when said judgement location satisfies said photographing condition.

The method may include photographing said subject based on said timing signal.

The method may include recording said photographed image of said subject on a replaceable nonvolatile recording medium based on said timing signal.

The method may include: determining an input condition for inputting said image based on information for said judgement location detected in said detecting step; and forming said image of said subject based on said input condition.

The method may include processing said image based on information for said judgement location detected in said detecting step.

According to the fourth aspect of the present invention, a method of photographing a plurality of images of a subject comprising: detecting variation of said subject in said plurality of said images based on information for said plurality of images; outputting a timing signal when said variation of said subject satisfies a predetermined photographing condition related to a desirable variation of said subject.

The method may include extracting data of an aimed object from each of said plurality of images of said subject based on an extracting condition, said detecting may include detecting variation of said aimed object based on information for said image, and said timing signal may be output when said variation of said aimed object satisfies said photographing condition.

The extraction of said aimed object may include detecting data of a judgement location from said data of said aimed object in each of said plurality of images based on a detecting condition different from said extracting condition, said detecting variation of said subject may include detecting variation of said judgement location based on information for said image, and said timing signal may be output when said variation of said judgement location satisfies said photographing condition.

The photographing condition may include a predetermined starting condition for starting detection of said variation of said judgement location, and said detecting of variation may start detecting said variation of said judgement location when said judgement location satisfies said starting condition.

The method may include photographing said image based on said timing signal.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
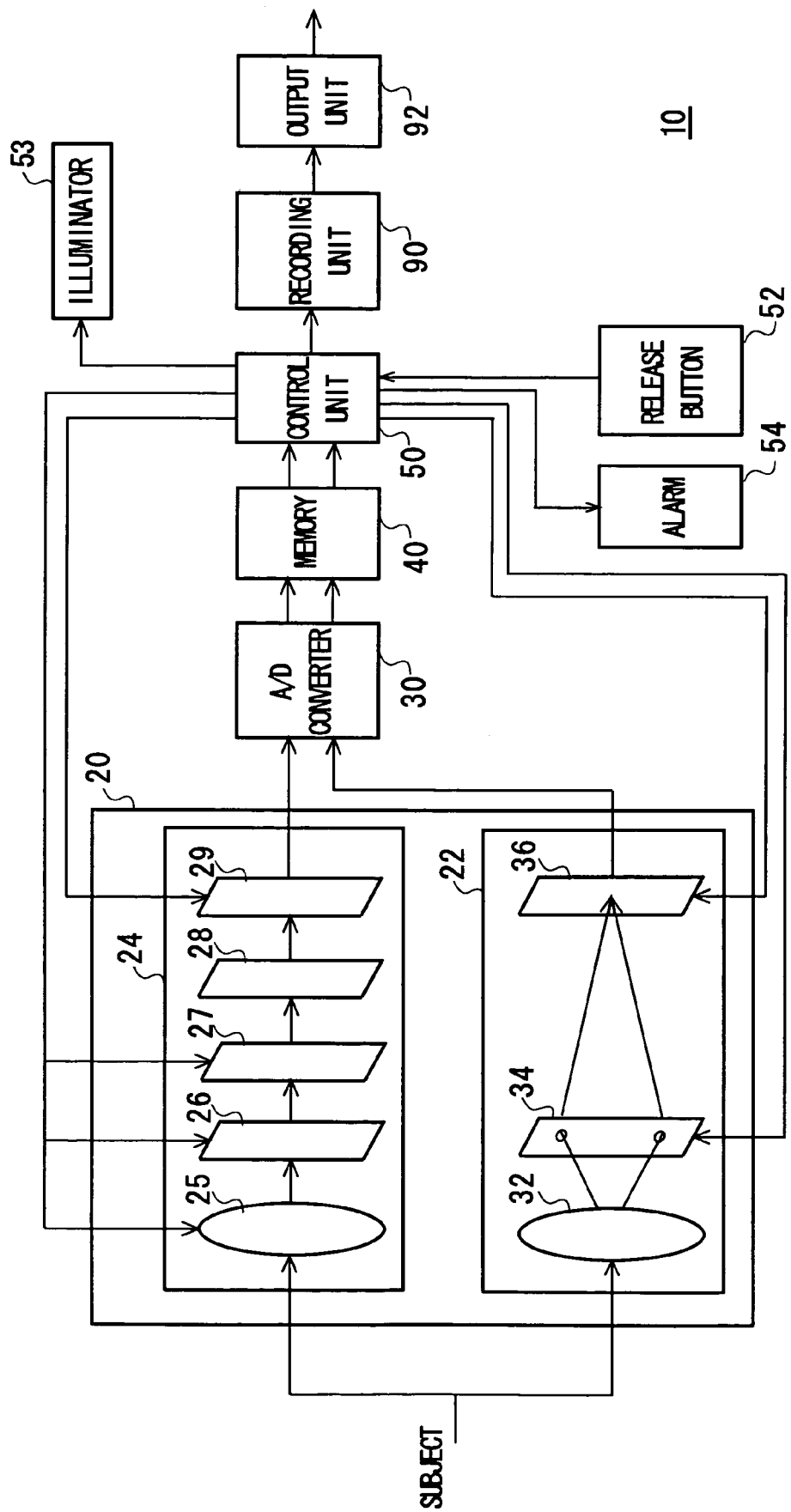
FIG. 1 shows a camera of the first embodiment according to the present invention.

FIG. 1 shows a camera 10 of the first embodiment according to the present invention. The camera 10 continuously photographs raw images of a subject and determines the timing for photographing a refined image based on the previously photographed raw images. The camera 10 photographs a refined image of the subject in accordance with the timing signal. Therefore, the timing for photographing a refined image may be automatically determined by the camera 10.

The camera 10 includes an input unit 20, an A/D converter 30, a memory 40, a control unit 50, a release button 52, an alarm 54, a recording unit 90 and an output unit 92. The camera 10 of this embodiment further includes an illuminator 53. The camera 10 may be, for example, a digital still camera or a digital video camera that can photograph a still image.

The input unit 20 includes a parallactic image data input unit 22 and a normal image data input unit 24. The parallactic image data input unit 22 inputs parallactic images which are photographed from different viewpoints. The parallactic image data input unit 22 has a parallactic lens 32, a parallactic shutter 34, and a parallactic charge coupled device (CCD) 36. The parallactic lens 32 forms an image of a subject. The parallactic shutter 34 has a plurality of shutter units each of which serve as viewpoints. The parallactic shutter 34 opens one of the plurality of shutter units. The parallactic CCD 36 receives the image of the subject through the parallactic lens 32 and whichever of the shutter units of the parallactic shutter 34 that are opened. The parallactic CCD 36 also receives another image of the subject through the parallactic lens 32 and another of the shutter units of the parallactic shutter 34, which is opened at this time. The images received through the parallactic lens 32 and the parallactic shutter 34 form a parallactic image. Thus, the parallactic CCD 36 receives the parallactic image of the subject formed by the parallactic lens 32 and converts it to electronic signals.

The normal image data input unit 24 inputs a normal image photographed from a single viewpoint. The normal image data input unit 24 has a lens 25, a lens stop 26, a shutter 27, a color filter 28 and a charge coupled device (CCD) 29. The lens 25 forms an image of a subject. The lens stop 26 adjusts an aperture condition. The shutter 27 adjusts exposure time. The color filter 28 separates RGB components of the light received through the lens 25. The CCD 29 receives the image of the subject formed by the lens 25 and converts it to electric signals.

The A/D converter 30 receives analog signals from the parallactic image data input unit 22 and the normal image data input unit 24. The A/D converter 30 converts the received analog signals to digital signals and outputs the digital signals to the memory 40. The memory 40 stores the input digital signals. This means that the memory 40 stores the data of the parallactic image, the subject photographed by the parallactic image data input unit 22, and the data of the normal image of the subject photographed by the normal image data input unit 24.

The control unit 50 outputs a timing signal for starting photographing of an image of a subject when the subject satisfies a predetermined photographic condition. The timing signal is input to the input unit 20. The camera 10 then starts the photographing operation based on the timing signal, to obtain a refined image of the subject. The control unit 50 processes the photographed refined image and outputs the processed image. The control unit 50 controls at least one of the following conditions: focus condition of the lens 25, aperture condition of the lens stop 26, exposure time of the shutter 27, output signal of the CD 29, condition of the parallactic shutter 34, and output signal of the parallactic CCD 36. The control unit 50 also controls the illuminator 53.

The release button 52 outputs to the control unit 50 a signal for starting the photographing operation. This means that when a user of the camera 10 pushes the release button 52, the signal is output to the control unit 50. The control unit 50 then controls the input unit 20 for photographing an image of the subject.

As described above, the camera 10 is capable of automatically photographing a refined image of the subject by determining best timing for photographing the refined image. However, the camera 10 is also capable of photographing the image at a desirable timing for the user of the camera 10, when he/she pushes the release button 52. The camera 10 may have a switch, not shown in the drawings, for selecting an automatic photographing mode in which the best timing for photographing the image is automatically determined, and a manual photographing mode in which the user of the camera 10 determines the desirable timing.

The alarm 54 outputs an alarm signal upon receiving the timing signal from the control unit 50. The alarm 54 may be, for example, an alarm generator or a light-emitting diode. Thus, the user of the camera 10 can know the best timing determined by the camera 10 for photographing a refined image of the subject.

The recording unit 90 records the image output from the control unit 50 on a recording medium. The recording medium may be, for example, a magnetic recording medium such as a floppy disk, or a nonvolatile memory such as a flash memory.

The output unit 92 outputs the image recorded on the recording medium. The output unit 92 may be, for example, a printer or a monitor. The output unit 92 may be a small liquid crystal display (LCD) of the camera 10. In this case, the user can see the image processed by the control unit 50 immediately after photographing the image. The output unit 92 may be an external monitor connected to the camera 10.

Figure 2:
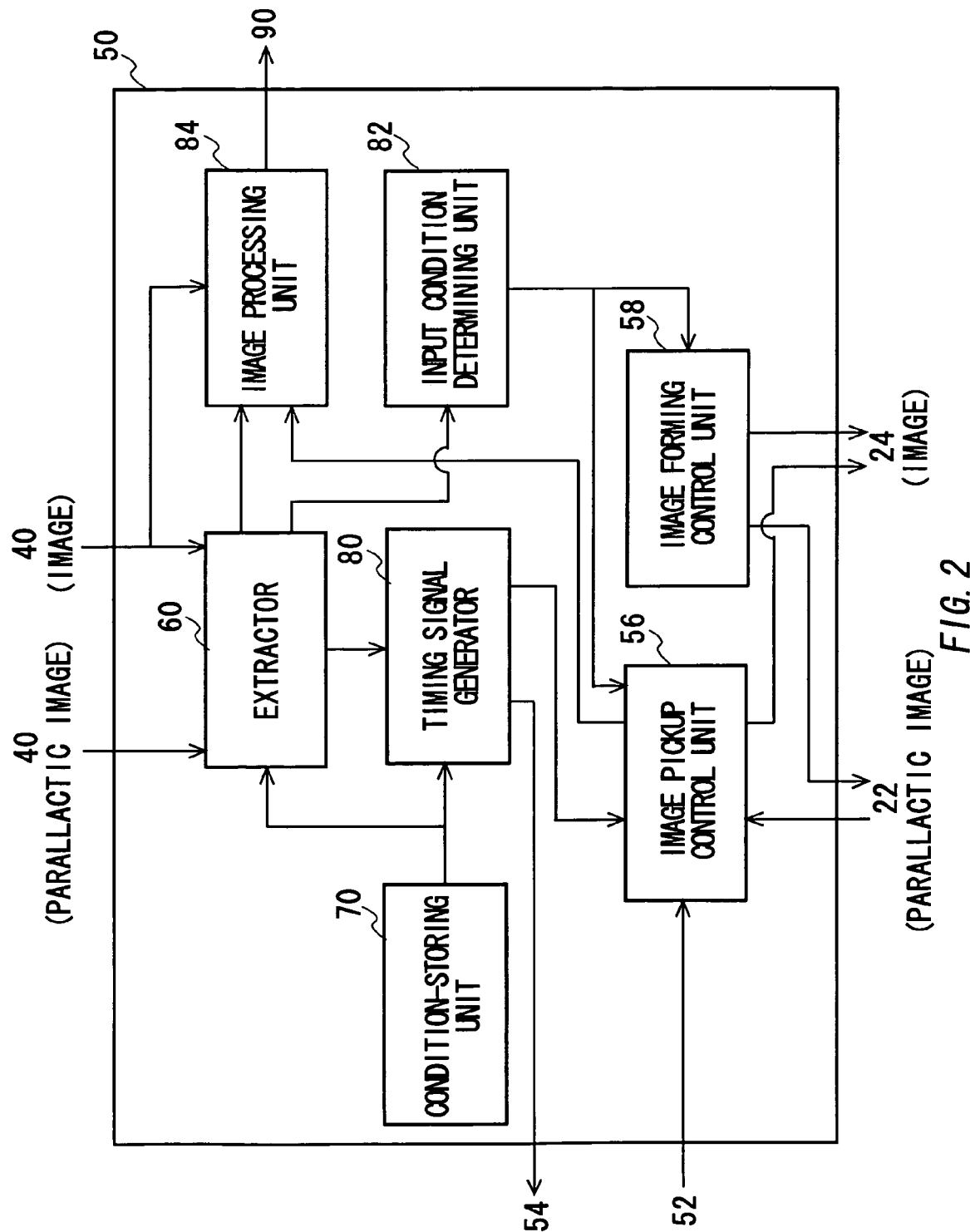
FIG. 2 is a block diagram of the control unit of the first embodiment.

FIG. 2 is a block diagram of the control unit 50 according to the first embodiment. The control unit 50 includes an image pickup control unit 56, an image forming control unit 58, an extractor 60, a condition-storing unit 70, a timing signal generator 80, an input condition determining unit 82, and an image processing unit 84.

The extractor 60 receives a parallactic image photographed by the parallactic image data input unit 22 and a raw image photographed by the image data input unit 24, from the memory 40. The extractor 60 extracts an aimed object from the raw image based on the information obtained from the parallactic image and the raw image. The information includes image information of the raw image and depth information of the parallactic image. The aimed object defined here is an independent object at which a photographer aims when photographing. The aimed object may be, for example, a person in a room when the person and the objects in the room are photographed, a fish in an aquarium when the fish and the aquarium are photographed, or a bird stopping on a branch of a tree when the bird and the tree are photographed.

The extractor 60 then detects a judgement location from the aimed object based on the information obtained from the parallactic images and the raw images. The judgement location defined here is a location to which specific attention is paid when selecting a desirable image. The judgement location may be, for example, an eye of a person when the person is photographed, or a wing of a bird when the bird is photographed. The aimed object may be an area including the judgement location, extracted for a certain purpose. The information for the judgement location is output to the timing signal generator 80, the input-condition-determining unit 82 and the image-processing unit 84.

The condition-storing unit 70 stores predetermined conditions related to a judgement location which should be included in a raw image obtained by photographing a subject. The best timing for photographing a refined image of the subject in this embodiment is when the aimed object in the image is in good condition. This means that a judgement location included in the aimed object satisfies the predetermined conditions stored in the condition-storing unit 70. The condition-storing unit 70 may store a plurality of photographing conditions. The condition-storing unit 70 may include a condition-setting unit, not shown in the drawings, by which a user can select at least one of the photographing conditions from among a plurality of photographing conditions.

The timing signal generator 80 outputs a timing signal for photographing an image. The timing signal generator 80 outputs the timing signal when the judgement location detected by the extractor 60 satisfies the predetermined photographing condition stored in the storing unit 70.

The input-condition-determining unit 82 determines an input condition for inputting a refined image, based on the information for the aimed object or the judgement location received from the extractor 60. The input condition is output to the image-forming control unit 58. The input condition may be, for example, focus condition of the lens 25 such that the aimed object including the judgement location is focussed.

As the input unit 20 inputs an image in accordance with the input condition such as the focus condition of the lens 25, determined by the input-condition-determining unit 82, the camera 10 can photograph a refined image in which the subject is in good condition.

The image-forming control unit 58 controls the input unit 20 to form a refined image of the subject based on the input condition determined by the input-condition-determining unit 82. This means that the image-forming control unit 58 controls at least one of the conditions including focus condition of the lens 25, aperture condition of the lens stop 26, exposure time of the shutter 27, and condition of the parallactic shutter 34, based on the input condition.

The image-pickup control unit 56 controls the input unit 20 to photograph a refined image of the subject based on the input condition determined by the condition-determining unit 70. This means that the image-pickup control unit 56 controls at least one of the conditions including output signal of the CCD 29 and output signal of the parallactic CCD 36, based on the input condition. The output signal of the CCD 29 determines the gradation characteristics based on a gamma (γ) curve and sensitivity.

The image-pickup control unit 56 controls the input unit 20, to photograph a refined image based on the timing signal output from the timing signal generator 80. The image-pickup control unit 56 controls the image-processing unit 84 to process the refined image. The image-pickup control unit 56 may control the illuminator 53, for flashing a light preceding or at the same time as photographing a refined image by the input unit 20. The image-pickup control unit 56 also controls the image-processing unit 84, to process the input refined image.

The image-processing unit 84 receives the refined image photographed by the image data input unit 24 from the memory 40. The image-processing unit 84 then processes the refined image based on the information for the aimed object or the judgement location extracted from the extractor 60.

Examples of the process condition for processing a normal image are explained in the following.

The process condition for processing a normal image may relate to compression of the image. The process condition in this case is determined based on the data for the aimed object. The image-processing unit 84 separately determines the compressing condition of the image for the aimed object and for the components other than the aimed object so that the quality of the aimed object does not deteriorate, even though the data size of the image itself is compressed. The image processing unit 84 may separately determine the color compressing condition for the aimed object and the components other than the aimed object.

The process condition for processing a normal image may relate to color of the image. The process condition in this case is determined based on the depth information. The processing-condition-determining unit 74 may, for example, separately determine the color condition for the aimed object and the components other than the aimed object, so that all the components have optimum gradation.

The image-processing unit 84 may determine a processing condition in which the aimed object in the image is magnified and the magnified aimed object is composited with a background image. The background image may be the components included in the original image other than the aimed object, or an image previously selected by the user of the camera 10. The image-processing unit 84 may then composite the data for the aimed object and the data for the components other than the aimed object to form a composite image.

As described above, the extractor 60 extracts the data for the aimed object and the judgement location from the image, and the aimed object and the judgement location can be processed separately from the components other than these parts.

Since cameras are usually used to photograph human beings, the best timing for photographing a refined image means that the targeted person has a good appearance. The good appearance of the person may be when, for example, "the person is not blinking", "the person's eyes are not red-eyed", "the person is looking at the camera", or "the person is smiling". The condition-storing unit 70 stores these conditions as the photographing conditions. The condition-storing unit 70 may set a photographing condition by selecting at least one of the photographing conditions stored therein.

The method of outputting a timing signal for photographing a refined image of a subject when a targeted person has a good appearance will be explained. The condition-storing unit 70 stores conditions such as "the person is not blinking", "the person's eyes are not red-eyed", "the person is looking at the camera", and "the person is smiling" as the photographing conditions. These photographing conditions relate to the face of the person, and more specifically to the eyes or mouth of the person. Therefore, it is assumed in this embodiment that the aimed object is the face area of the person and the judgement location is the eyes or mouth of the person.

Each of the photographing conditions has a reference situation for the judgement location, which should meet the requirements of the photographing condition. The condition-storing unit 70 also stores the reference situations for the judgement location, each respectively corresponding to each of the photographing conditions. The reference situations for the judgement location corresponding to each of the photographing conditions will be described in the following.

For the conditions such as "the person is not blinking", "the person's eyes are not red-eyed" and "the person is looking at the camera", the reference situation may relate to the shape of the eye, color of the eye, and size of the eye. For the condition such as "the person is smiling", the reference situation may also relate to the size of the eye, as well as shape of the mouth, and size of the mouth. Whether each of the judgement locations satisfies each of these reference situations or not is judged in accordance with predetermined algorithms based on experience.

When the photographing condition "the person is not blinking" is selected, the judgement location may be the eye of the person. The reference situation for the eye in this photographing condition will be determined as follows. When a person blinks, his/her eyelid hides his/her eyeball. While he/she is blinking and his/her eye is partially closed, the white part of his/her eyeball is especially hidden by his/her eyelid. This means that when the person is not blinking, the white part of his/her eyeball should be relatively large. Therefore, the reference situation for the photographing condition "the person is not blinking" becomes "the white part of his/her eyeball has a large dimension".

When the photographing condition "the person's eyes are not red-eyed" is selected, the judgement location may be the eyes of the person. The reference situation for the eyes in this photographing condition will be determined as follows. Eyes of a person are usually red-eyed when the person is photographed using a flash in a dark situation. This happens because the person's eyes cannot sensibly compensate for the sudden brightness and his/her pupils become red. This means that when the person's eyes look red-eyed, his/her pupils in each iris become red and the rest of the iris does not become red. Typically, people of Asian descent have brown or dark brown colored irises, and people of European descent have green or blue colored irises. Therefore, the reference situation for the photographing condition "the person's eyes are not red-eyed" becomes "the red part in his/her iris has a small dimension".

When the photographing condition "the person is looking at the camera" is selected, the judgement location may be the eye of the person. The reference situation for the eye in this photographing condition will be determined as follows. When a person is looking at the camera, a line between the camera and the iris of the person and a normal vector of his/her iris are almost the same. Therefore, the reference situation for the photographing condition "the person is looking at the camera" becomes "the normal vector of the iris in his/her eye is approximately equal to the angle of the line between the camera and his/her iris".

When the photographing condition "the person is smiling" is selected, the judgement location may be the eyes and the mouth of the person. The reference situation for the eyes and the mouth in this photographing condition will be determined as follows. When a person is smiling, although it depends on each person, his/her eyes become relatively thin. At this time, although it depends on each person, his/her mouth expands right-and-left wards and his/her teeth are shown. Therefore, the reference situations for the photographing condition "the person is smiling" become "the white part in his/her eyes has a small dimension", "the width of his/her mouth is wide" and "the white area in his/her mouth has a large dimension".

Figure 3:
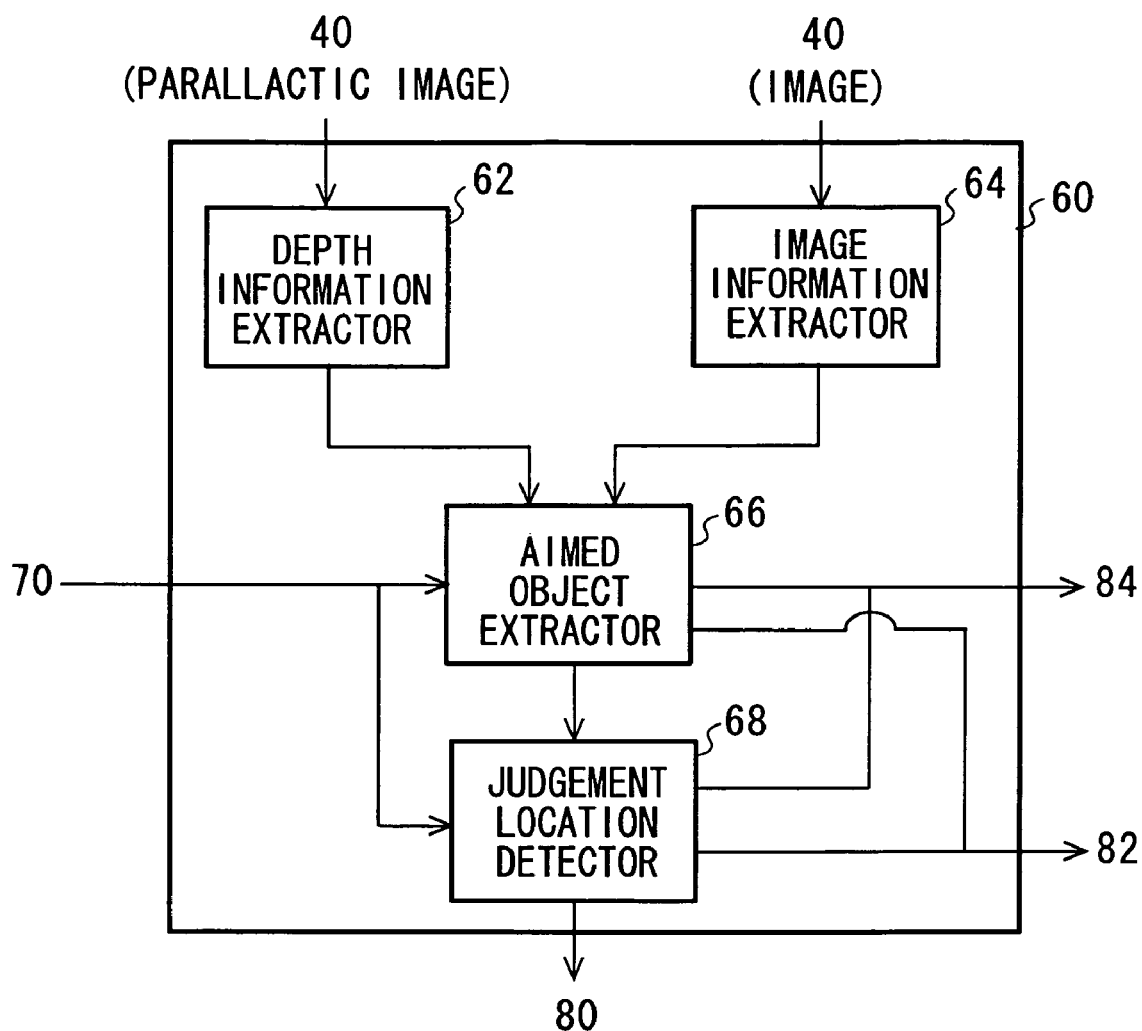
FIG. 3 is a block diagram of the function of the extractor.

FIG. 3 is a block diagram of the function of the extractor 60. The extractor 60 includes a depth information extractor 62, an image information extractor 64, an aimed object extractor 66 and a judgement location detector 68.

The depth information extractor 62 extracts the depth information indicating the distance to each of components of the subject, based on the data for the parallactic image received from the memory 40. This means that the depth information extractor 62 determines a corresponding point for each of the components based on the parallactic image and gives a parallax amount. The depth information extractor 62 extracts the depth information based on the parallax amount of each of the components. Determining the corresponding point is a known technique, thus the explanation of this technique will be omitted. Extracting the depth information based on the parallax amount is also a known technique using the principle of triangulation, thus the explanation of this technique will be omitted.

The image information extractor 64 extracts the image information for normal images, from the data for the normal images received from the memory 40. The image information includes, for example, data for the normal image such as luminescence distribution, intensity distribution, color distribution, texture distribution, and motion distribution.

The aimed object extractor 66 extracts data for the face area of the person as the aimed object, based on the depth information and the image information. Each of the images may include, for example, a plurality of components. The aimed object extractor 66 recognizes each of the components based on the depth information. The aimed object extractor 66 then specifies the face area by referring to the depth information and the image information of each of the components. The method of specifying the face area will be described in the following.

The aimed object extractor 66 receives the photographing condition from the condition-storing unit 70. The aimed object extractor 66 extracts the aimed object based on the photographing condition. In this embodiment, the aimed object is the face of the photographed person. Therefore, at first, the component including the face is specified depending on assumptions such as "the person should be close to the camera", "the person should be in the middle of the image", or "the proportional relationship of the height of the person to the width and height of the image should be within a predetermined range". The distance from the camera to each of the components in the image is evaluated based on the depth information. The distance from the center of the image to each of the components in the image, and the proportional relationship of the height of the components are evaluated based on the image information. Each of the values is multiplied by predetermined constants corresponding to each condition. The multiplied values are added for each of the components. The added values are defined as weighted averages. The component having the largest weighted average is extracted as the component including the aimed object.

The constants by which the values for each of the components are multiplied may be predetermined based on the aimed object. In this embodiment, for example, the aimed object is assumed to be the face of the photographed person. Therefore, the aimed object extractor 66 specifies the area having a skin color as the face part, based on the image information. The colors of each of the components are evaluated based on the color distribution of the images. The values of the color distribution may also be multiplied by predetermined constants and the multiplied values are added for each of the components to give the weighted averages.

As described above, the aimed object extractor 66 extracts an aimed object based on the depth information in addition to the image information. Therefore, even when a plurality of people are photographed in the image and their faces are close to each other, the faces of the different people can be distinctly extracted.

The judgement location detector 68 detects the judgement location from the data for the face area extracted by the aimed object extractor 66. The judgement location detector 68 receives the photographing condition from the condition-storing unit 70. The judgement location detector 68 detects the judgement location based on the photographing condition. In this embodiment, the judgement location is the eyes or mouth of the photographed person. Therefore, the judgement location detector 68 detects the eyes and mouth from the face area.

There is relatively little variation in the eyes of people with respect to color, shapes or their place on the face. Therefore, patterns of eyes such as the color of the eyes, shape of the eyes, and the place of the eyes on the face are previously determined, and the parts which are approximately similar to the determined patterns of the eyes are recognized as the judgement location on the face. Similarly, there is relatively little variation in mouths of people with respect to color, shapes or place on the face. Therefore, patterns of the mouth are also previously determined and the parts which are approximately similar to the determined patterns of the mouth are recognized as the judgement location on the face.

The extractor 60 detects the judgement location from the extracted aimed object based on the image information for the aimed object. Therefore, the extractor 60 does not extract locations having similar shapes to the judgement location from the subject other than the aimed object included in the image.

The judgement location detector 68 then outputs the data for the detected judgement locations to the timing signal generator 80.

Referring back to FIG. 2, the method for judging the best timing for photographing an image will be explained in the following.

The timing signal generator 80 receives the data for the detected judgement locations from the extractor 60. The timing signal generator 80 also receives the photographing condition from the condition-storing unit 70. The timing signal generator 80 compares each of the judgement locations based on the reference situation for the photographing condition. The timing signal generator 80 then generates a timing signal when the judgement location satisfies the reference situation for the photographing condition.

When the photographing condition "the person is not blinking" is selected, the judgement location is the eyes and the reference situation is "the white part of his/her eyeball has a large dimension", as described above. Therefore, the timing signal generator 80 calculates the dimension of the white part of the eye detected by the judgement location detector 68 for each of the images, based on the image information. The timing signal generator 80 generates a timing signal when the dimension of the white part of the eye has a larger dimension than a predetermined dimension. The width of the eye is always the same, even when the person opens or closes his/her eye. Therefore, the predetermined dimension may be determined relative to the width of the eye. People usually blink both eyes at the same time, therefore, the timing signal generator 80 may check only one of the eyes of the photographed person. However, by checking both eyes, the desired judgement location can be selected more precisely.

When the photographing condition "the person's eyes are not red-eyed" is selected, the judgement location is the eyes and the reference situation is "the red part in his/her iris has a small dimension", as described above. Therefore, the timing signal generator 80 calculates the dimension of the red part in the iris of the eye detected by the judgement location detector 68 for the image, based on the image information. The iris of his/her eye is recognized as being a cylindrical or elliptic area whose circumference has a brownish or blue/green color. The timing signal generator 80 generates a timing signal when the dimension of the red part of the eye has smaller dimension than a predetermined dimension. Both eyes of people are usually red eyed at the same time, therefore, the timing signal generator 80 may check only one of the eyes of the photographed person. However, by checking both of his/her eyes, the desired judgement location can be selected more precisely.

When the photographing condition "the person is looking at the camera" is selected, the judgement location is the eye and the reference situation is "the normal vector of the iris in his/her eye is approximately equal to the angle of the line between the camera and his/her iris", as described above. Therefore, the timing signal generator 80 recognizes the iris as being a cylindrical or elliptic area whose circumference has a brownish or blue/green color. The timing signal generator 80 then recognizes the center of the iris and the normal vector of the center of the iris. The timing signal generator 80 generates a timing signal when the normal vector of the iris in the eye is closer to the line between the camera and the iris than a predetermined distance.

The normal vector of the iris can be obtained from the relative position of the camera and the face of the person, the relative position of the face and the eyes of the person, and the relative position of the eyes and the irises of the person. The timing signal generator 80 may judge the desired judgement location based on the normal vector obtained from these relative positions.

When the photographing condition "the person is smiling" is selected, the judgement location is the eyes or the mouth and the reference situation is "the white part in his/her eye has a small dimension", "the width of his/her mouth is wide" or "the white part in his/her mouth has a large dimension", as described above. Therefore, the timing signal generator 80 calculates the dimension of the white part of the eye, the width of the mouth, and the dimension of the white part of the mouth detected by the judgement location detector 68 for each of the images, based on the image information. The timing signal generator 80 generates a timing signal when the white part of the eye has a smaller dimension than a predetermined dimension, when the mouth has a wider width than a predetermined width, or when the white part of the mouth has a larger dimension than a predetermined dimension. The predetermined dimension for the white part of the eye is relatively determined with respect to the width of the eye. The predetermined width for the mouth is relatively determined with respect to the width of the face of the person. The predetermined dimension for the white part of the mouth is relatively determined with respect to the dimension of the face of the person.

The timing signal generator 80 outputs a timing signal when the judgement location satisfies the above reference situations. As described above, the control unit 50 extracts the face part based on the raw image and the information for the raw image. The control unit 50 then detects the judgement location from the data for the extracted face part. As the camera 10 photographs a subject when the detected judgement location satisfies the photographing condition, the camera 10 can automatically photograph a desirable refined image without bothering the photographer.

The method of generating a timing signal when a plurality of people is photographed, will be explained next.

When each of the images includes a plurality of people, the extractor 60 extracts the aimed object and detects the judgement locations for each of the people. This means that the aimed object extractor 66 extracts the face parts for each of the people from each of the images. The judgement location extractor 68 detects the eyes or the mouth for each of the people from each of the images.

When each of the images includes a plurality of people, the timing signal generator 80 compares each of the judgement locations for each of the people based on the reference situation for the photographing condition. The timing signal generator 80 may generate a timing signal when the judgement locations for many of the people satisfy the reference situation for the photographing condition. The timing signal generator 80 may output the timing signal when the ratio of the judgement locations satisfying the photographing condition against all of the plurality of the judgement locations exceeds a predetermined ratio. In this case, the camera 10 can photograph a refined image in which many of the people have a good appearance.

Figure 4:
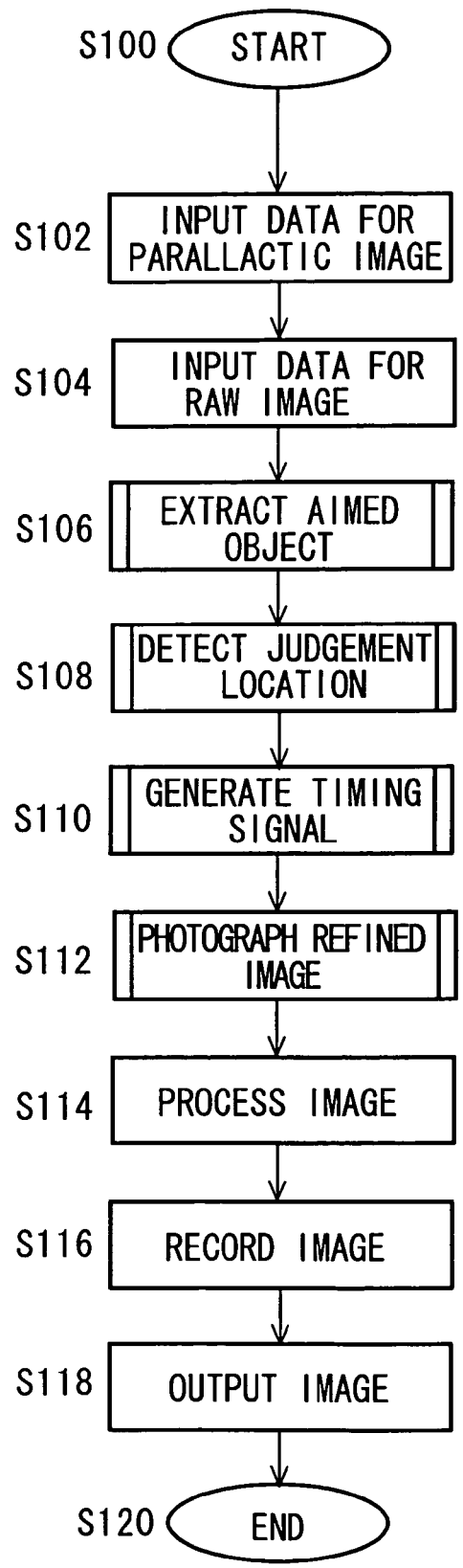
FIG. 4 is a flowchart showing a method of photographing an image.

FIG. 4 is a flowchart showing a method of photographing an image. The camera 10 starts photographing the subject when the release button 52 is pushed (S100). When the camera 10 starts photographing, data for a parallactic image is input from the parallactic image data input unit 22 (S102). At the same time, data for raw images are continuously input from the image data input unit 24 (S104). Then, the aimed object extractor 66 extracts the face part of the targeted person as the aimed object (S106). The judgement location detector 68 detects the judgement location based on the image information for the face part (S108). The timing signal generator 80 generates and outputs a timing signal when the judgement location satisfies a predetermined photographing condition (S110). Upon receiving the timing signal, the image pickup control unit 56 controls the input unit 20 to photograph a refined image (S112).

The image-processing unit 84 processes the refined image, for example, compositing images and the like (S114). The recording unit 90 records the processed image on a recording medium (S116). The output unit 92 outputs the recorded image (S118). The photographing operation is terminated (S120).

Figure 5:
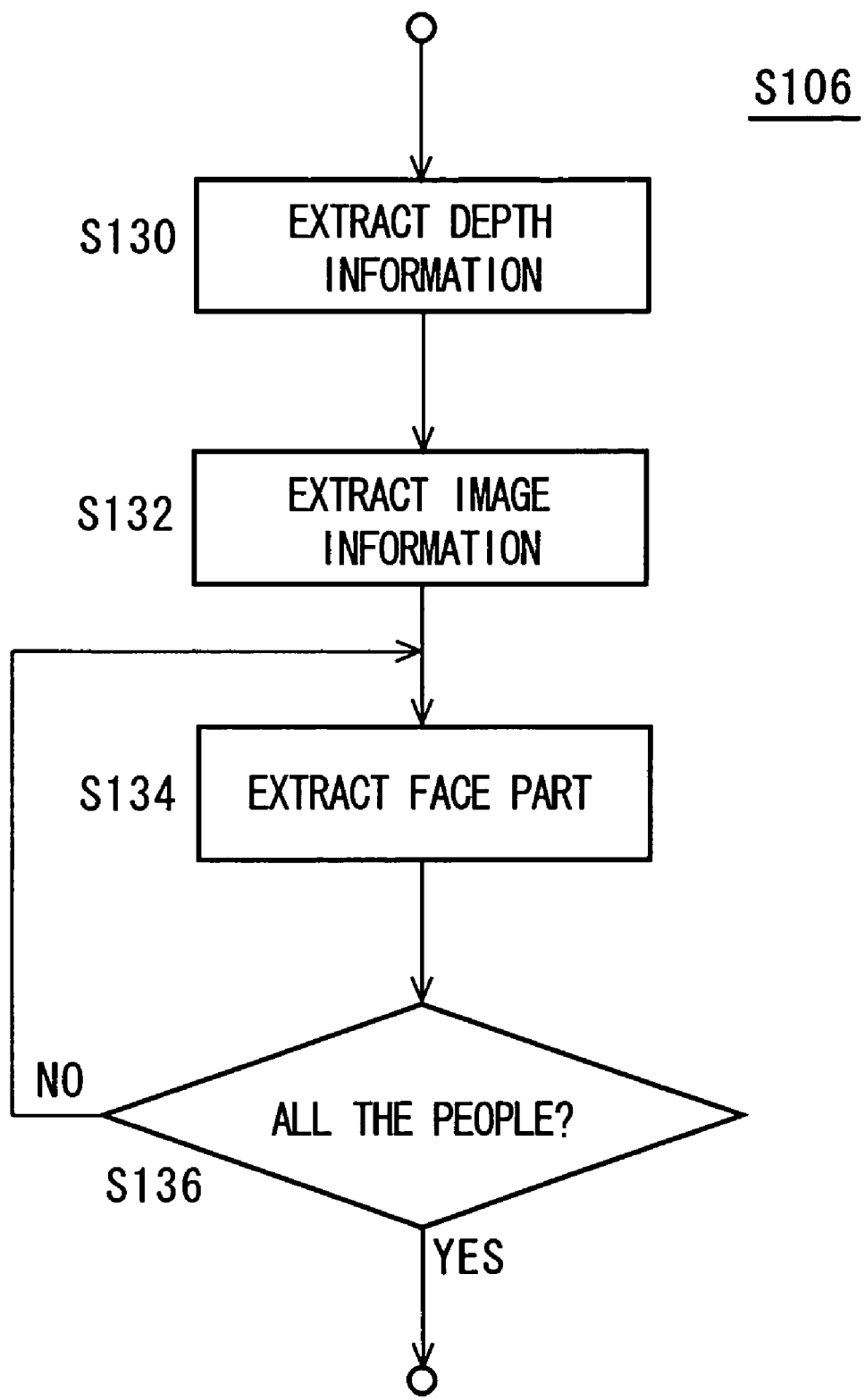
FIG. 5 is a flowchart showing in detail the method of extracting a face part, step 106 in FIG. 4.

FIG. 5 is a flowchart showing in detail the method of extracting a face part, step 106 in FIG. 4. The depth information extractor 62 extracts the depth information based on the parallactic image (S130). The image information extractor 64 extracts the image information based on the raw image (S132). Then, the aimed object extractor 66 extracts the face part of the targeted person based on the depth information and the image information (S134). When each of the images includes a plurality of people, the aimed object extractor 66 extracts the face parts for all of the people from each of the images (S136).

Figure 6:
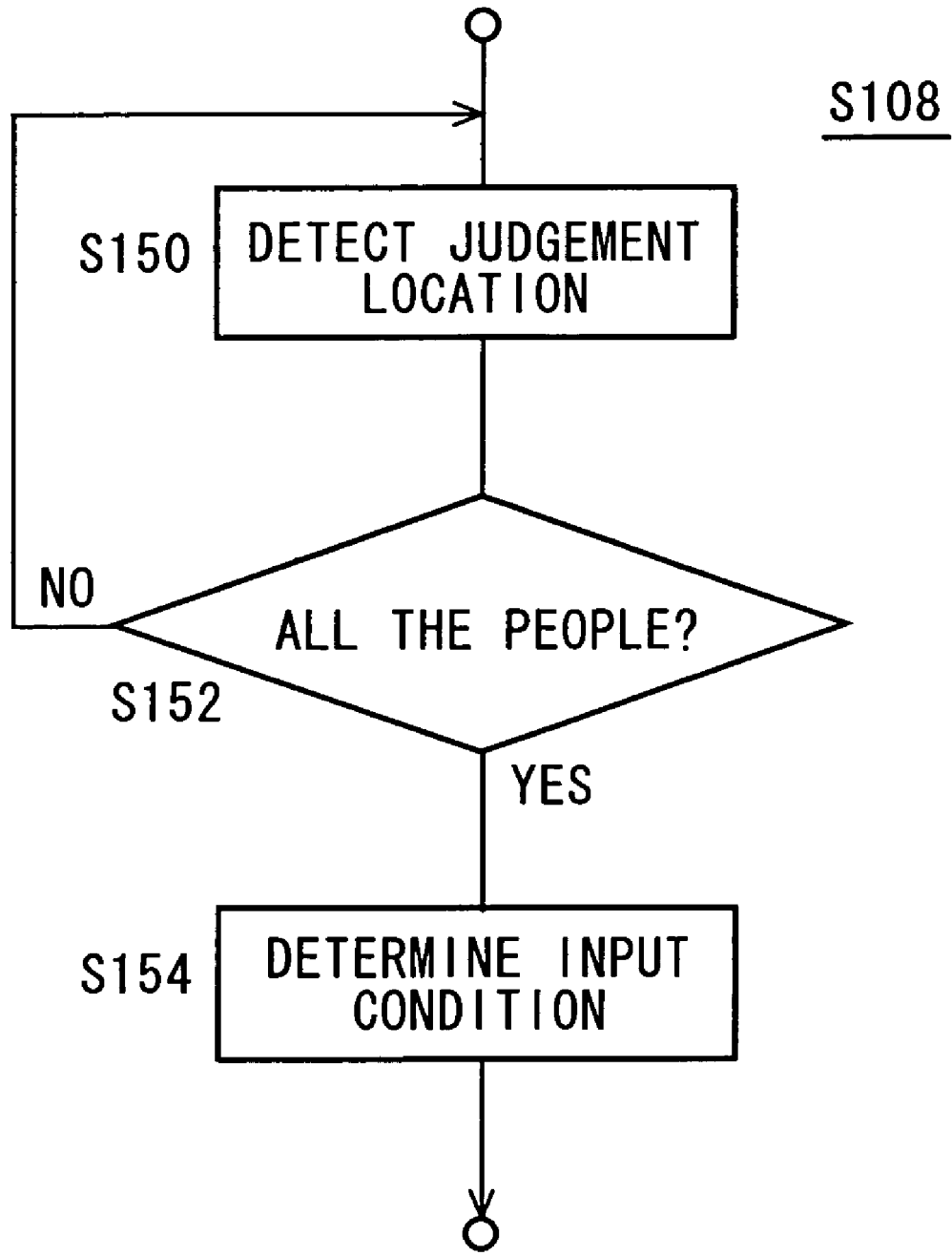
FIG. 6 is a flowchart showing in detail the method of detecting a judgement location, step 108 in FIG. 4.

FIG. 6 is a flowchart showing in detail the method of detecting a judgement location, step 108 in FIG. 4. The judgement location detector 68 detects the judgement location based on the image information for the face part (S150). When each of the images includes a plurality of people, the judgement location detector 68 detects the judgement locations for all of the people (S152 and S150). Then, the input-condition-determining unit 82 determines the input condition based on the image information for the judgement location (S154).

Figure 7:
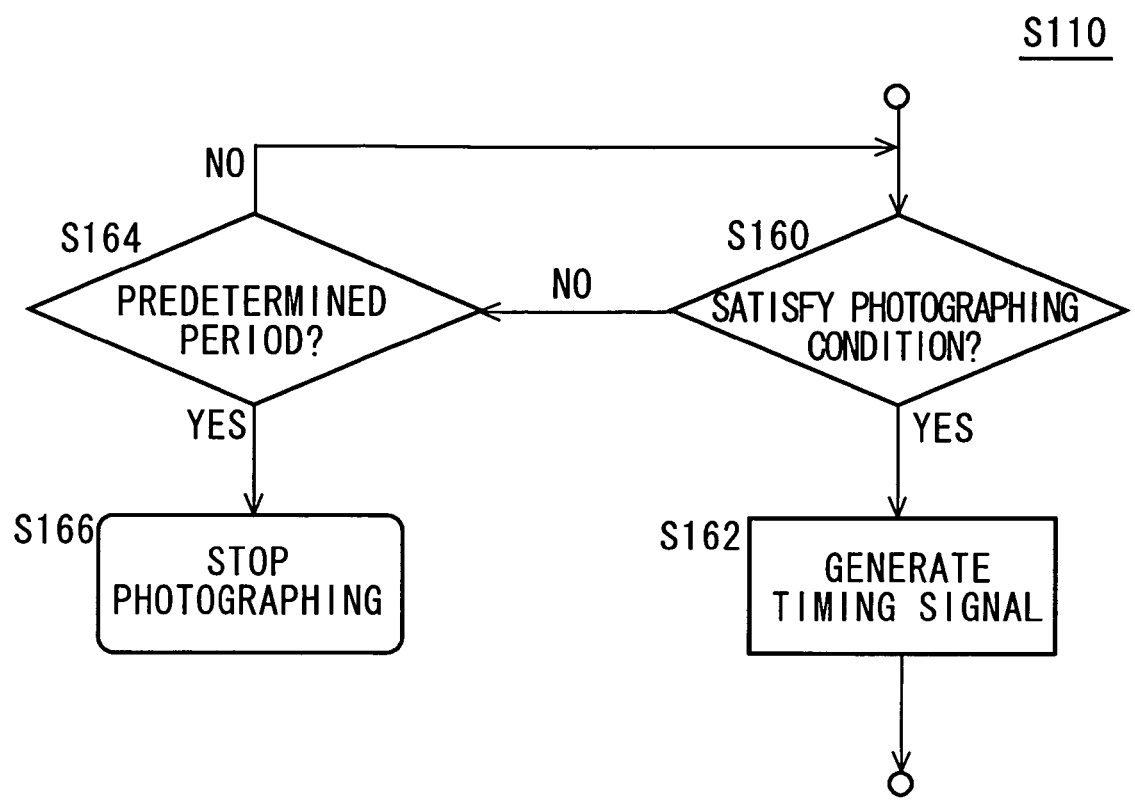
FIG. 7 is a flowchart showing in detail the method of generating a timing signal, step 110 in FIG. 4.

FIG. 7 is a flowchart showing in detail the method of generating a timing signal, step 110 in FIG. 4. The timing signal generator 80 judges whether the judgement location detected by the judgement location detector 68 satisfies the photographing condition or not (S160). The timing signal generator 80 continues judging whether the judgement location satisfies the photographing condition or not for a predetermined period (S164 and S160). The timing signal generator 80 generates a timing signal when the judgement location satisfies the photographing condition (S162). The image pickup control unit 56 controls the input unit 20 to stop photographing raw images when the judgement location does not satisfy the predetermined photographing condition for a predetermined period (S164 and S166).

Figure 8:
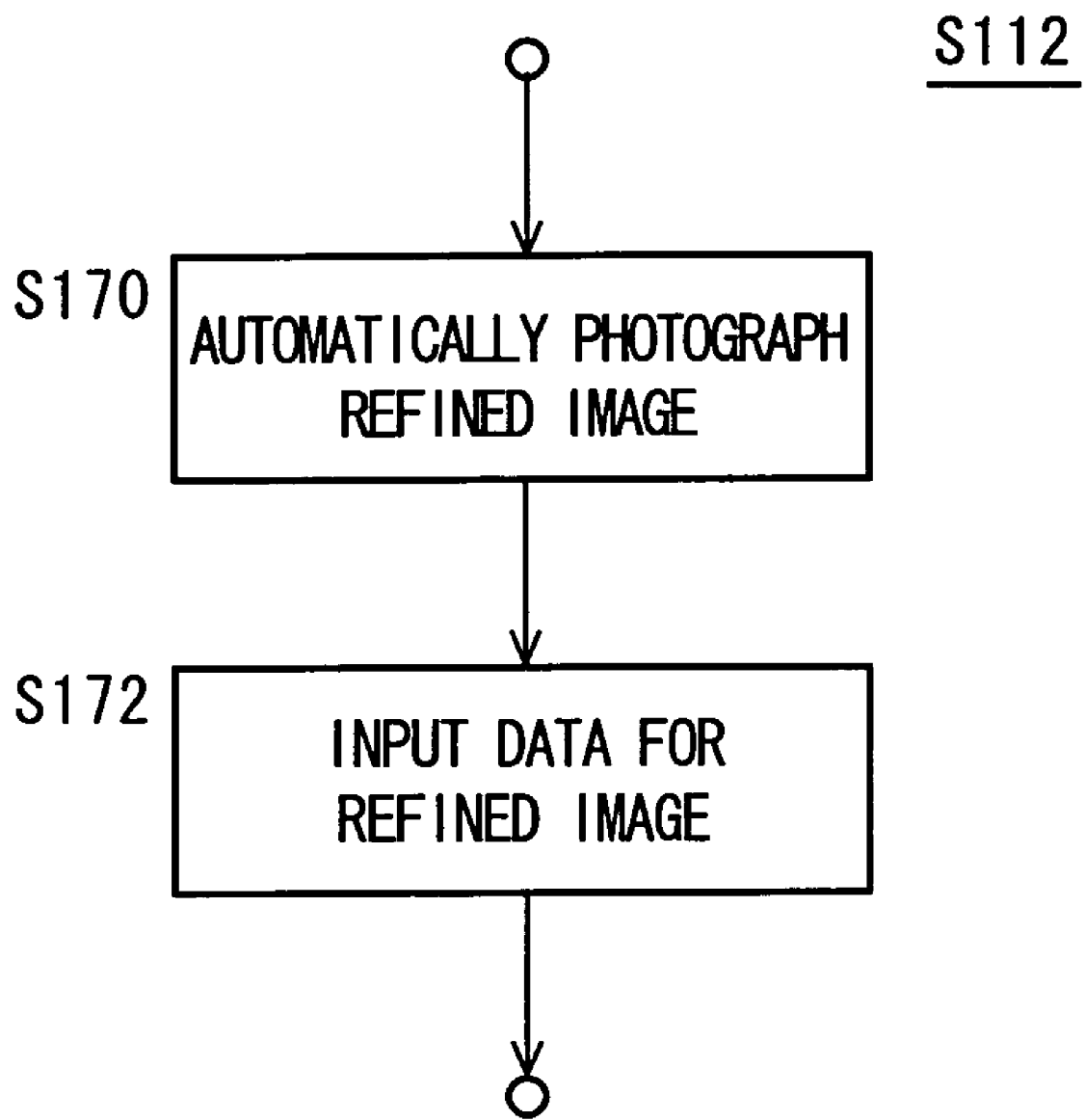
FIG. 8 is a flowchart showing in detail the method of photographing a refined image, step 112 in FIG. 4.

FIG. 8 is a flowchart showing in detail the method of photographing a refined image, step 112 in FIG. 4. The image pickup control unit 56 controls the input unit 20 to automatically photograph a refined image based on the timing signal output at the step 110 in FIG. 4 (S170). The input unit 20 inputs the data for the refined image (S172).

At the step 112 in FIG. 4, the camera 10 may not automatically photograph a refined image but the user of the camera 10 may push the release button 52 to photograph the refined image, upon receiving the alarm signal from the alarm 54.

Figure 9:
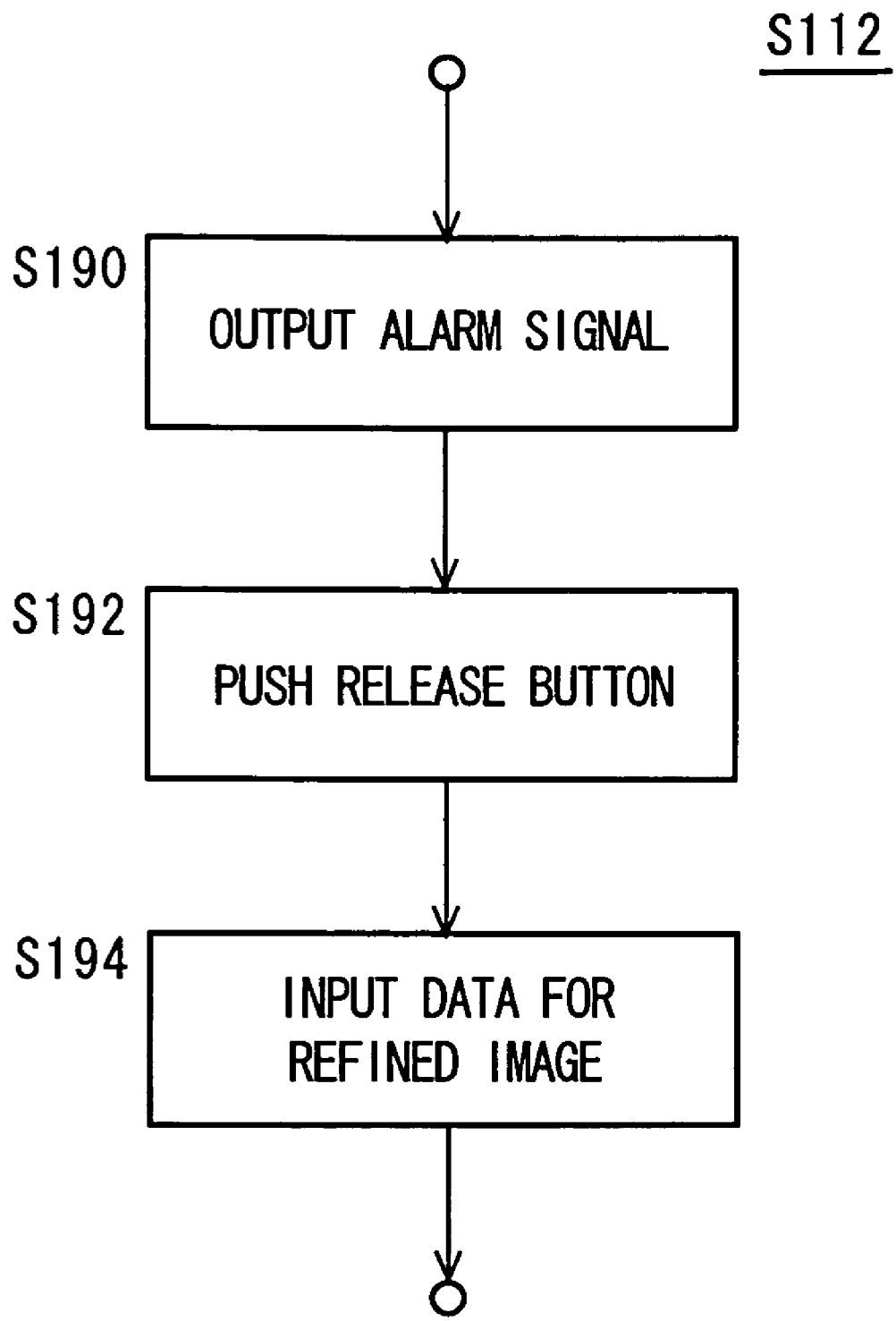
FIG. 9 is a flowchart showing in detail the method of photographing a refined image, step 112 in FIG. 4.

FIG. 9 is a flowchart showing in detail the method of photographing a refined image, step 112 in FIG. 4. The alarm 54 outputs an alarm signal such as an alarm sound or an alarm light based on the timing signal generated at the step 110 (S190). When the user, or the photographer of the camera 10 notices the alarm signal, and then pushes the release button 52 (S192), the camera 10 photographs a refined image (S194).

As the alarm 54 outputs the alarm sound or the alarm light based on the timing signal, the user can photograph a refined image at an optimum timing, without having to judge the timing himself. Furthermore, the targeted person can also notice the timing by the alarm sound or the alarm light.

The alarm 54 may output an alarm signal such as an alarm sound or an alarm light when the timing signal is not output from the timing signal generator for a predetermined period.

Figure 10:
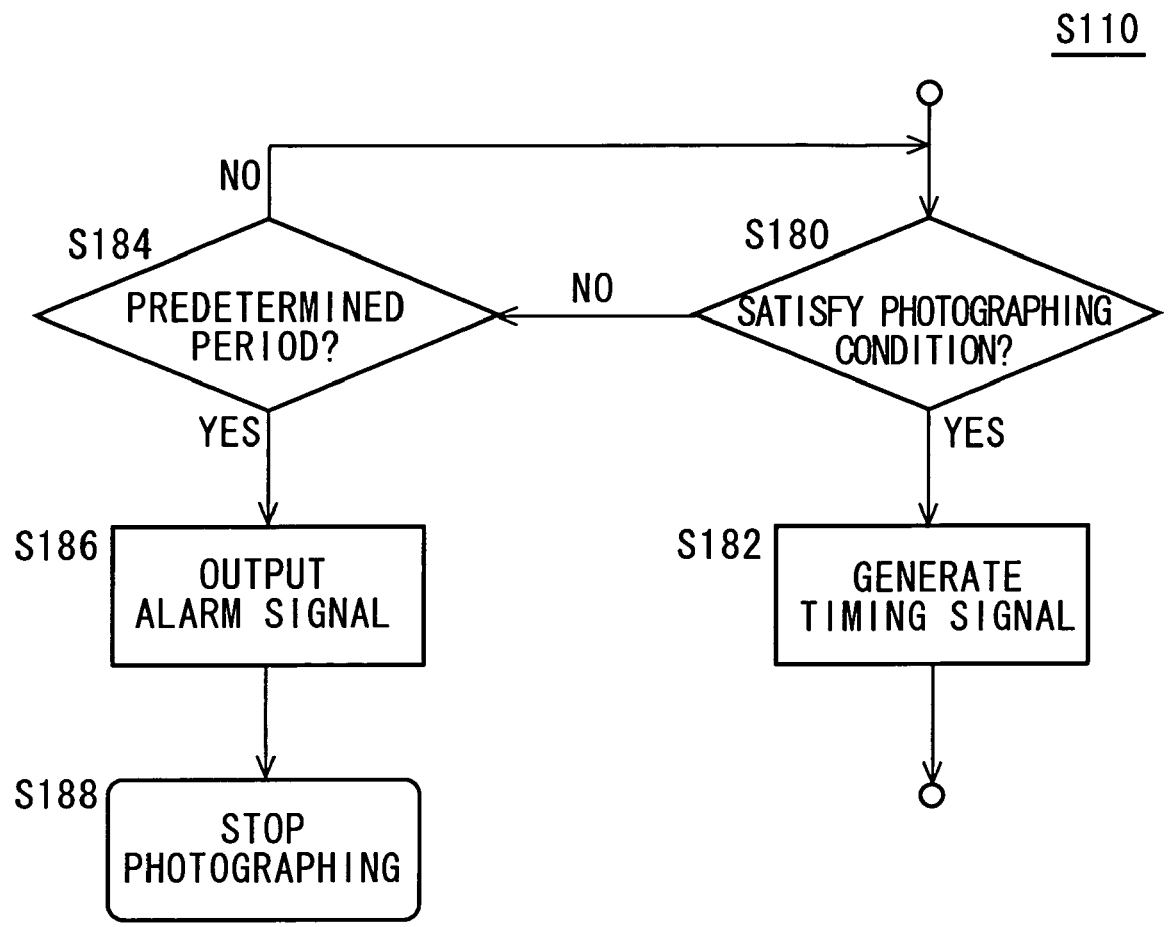
FIG. 10 is a flowchart showing in detail the method of generating a timing signal, step 110 in FIG. 4.

FIG. 10 is a flowchart showing in detail the method of generating a timing signal in which the alarm 54 outputs the alarm signal, step 110 in FIG. 4. The timing signal generator 80 judges whether or not the judgement location detected by the judgement location detector 68 satisfies the photographing condition (S180). The timing signal generator 80 continues judging whether or not the judgement location satisfies the photographing condition for a predetermined period (S184 and S180). The timing signal generator 80 generates a timing signal when the judgement location satisfies the photographing condition (s182). The alarm 54 outputs an alarm signal such as the alarm sound and the alarm light when the timing signal generator 80 does not output the timing signal for a predetermined period (S184 and S186). The image pickup control unit 56 controls the input unit 20 to stop photographing raw images at this time (S188).

As the alarm 54 outputs an alarm signal such as an alarm sound and an alarm light when the timing signal is not output within a predetermined period, the photographer and the targeted person become aware of the fact that the targeted person does not meet the photographing condition, by the sound and the light.

Figure 11:
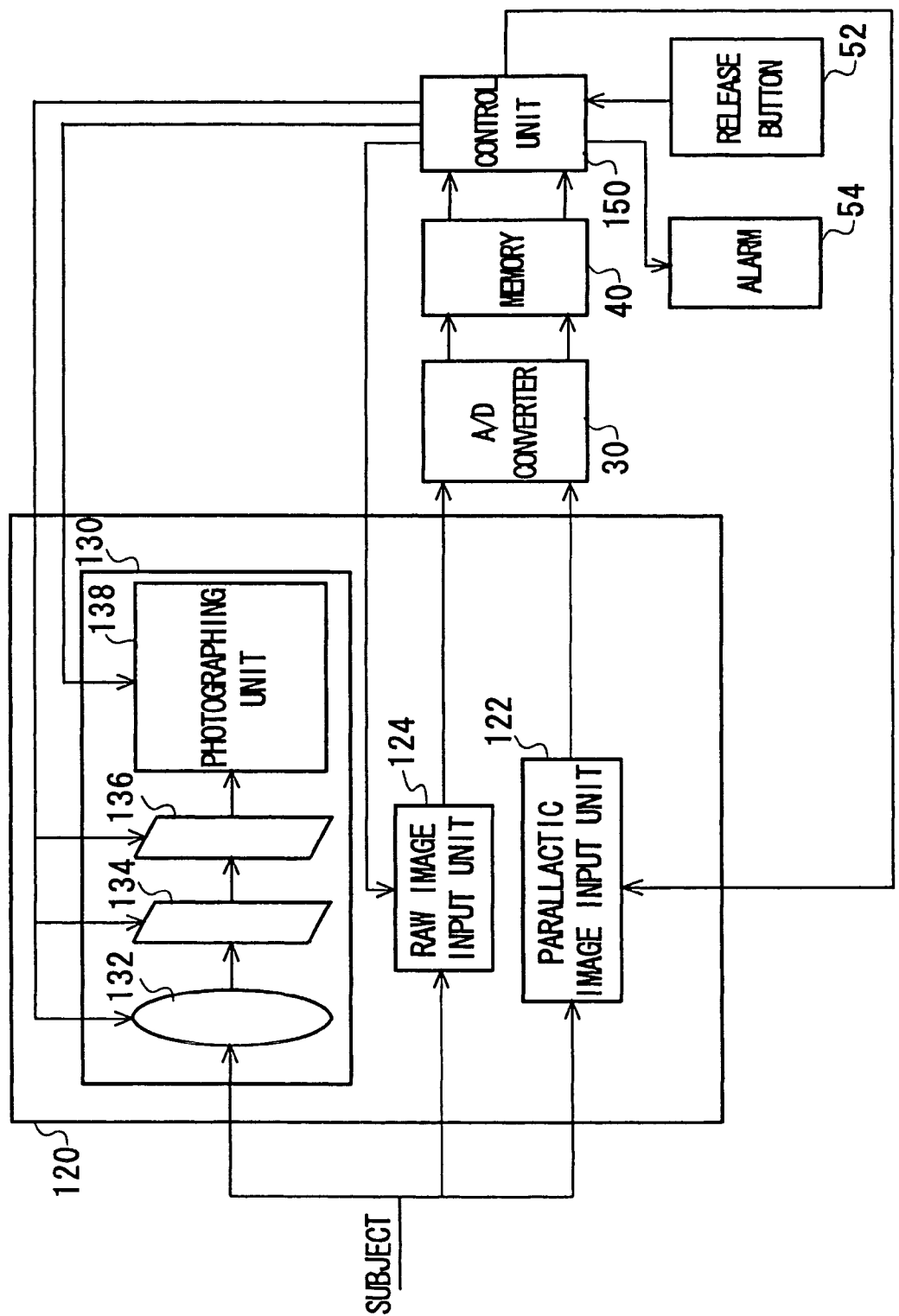
FIG. 11 shows a camera of the second embodiment according to the present invention.

FIG. 11 shows a camera 110 of the second embodiment according to the present invention. The camera 110 continuously photographs raw images of a subject. The camera 110 then photographs a refined image of the subject, in accordance with a predetermined input condition, at the timing when one of the previously photographed raw images satisfies a predetermined photographing condition. The camera 110 in this embodiment is a silver halide type camera by which an image of a subject is formed on a silver halide film. The camera 110 includes an input unit 120, an A/D converter 30, a memory 40, a control unit 150, a release button 52 and an alarm 54. The A/D converter 30, the memory 40, the release button 52 and the alarm 54 in this embodiment have the same structures and functions as those explained in the first embodiment. Therefore, the explanation of these parts will be omitted.

The input unit 120 includes a parallactic image data input unit 122, a raw image data input unit 124 and a refined image data input unit 130. The parallactic image data input unit 122 and the raw image data input unit 124 in this embodiment respectively have the same structures and functions as the parallactic image data input unit 22 and the image data input unit 24 explained in the first embodiment. The refined image data input unit 130 includes a lens 132, a lens stop 134, a shutter 136 and a photographing unit 138. The lens 132, the lens stop 134 and the shutter 136 in this embodiment respectively have the same structures and functions as the lens 25, the lens stop 26 and the shutter 27 shown in FIG. 1 of the first embodiment. The photographing unit 138 receives an optical image of a subject and forms an image of the subject on a silver halide film.

The image data input unit 24 of the first embodiment inputs both a raw image and a refined image. As for the camera 110 of this embodiment, the raw image data input unit 124 inputs an electronic raw image and the refined image data input unit 130 inputs a refined image and forms the refined image on a film. The raw image data input unit 124 has a CCD for receiving the image of the subject in the same way as the data input unit 24 of the first embodiment. The raw image data input unit 124 outputs electronic signals for the image converted by the CCD.

Figure 12:
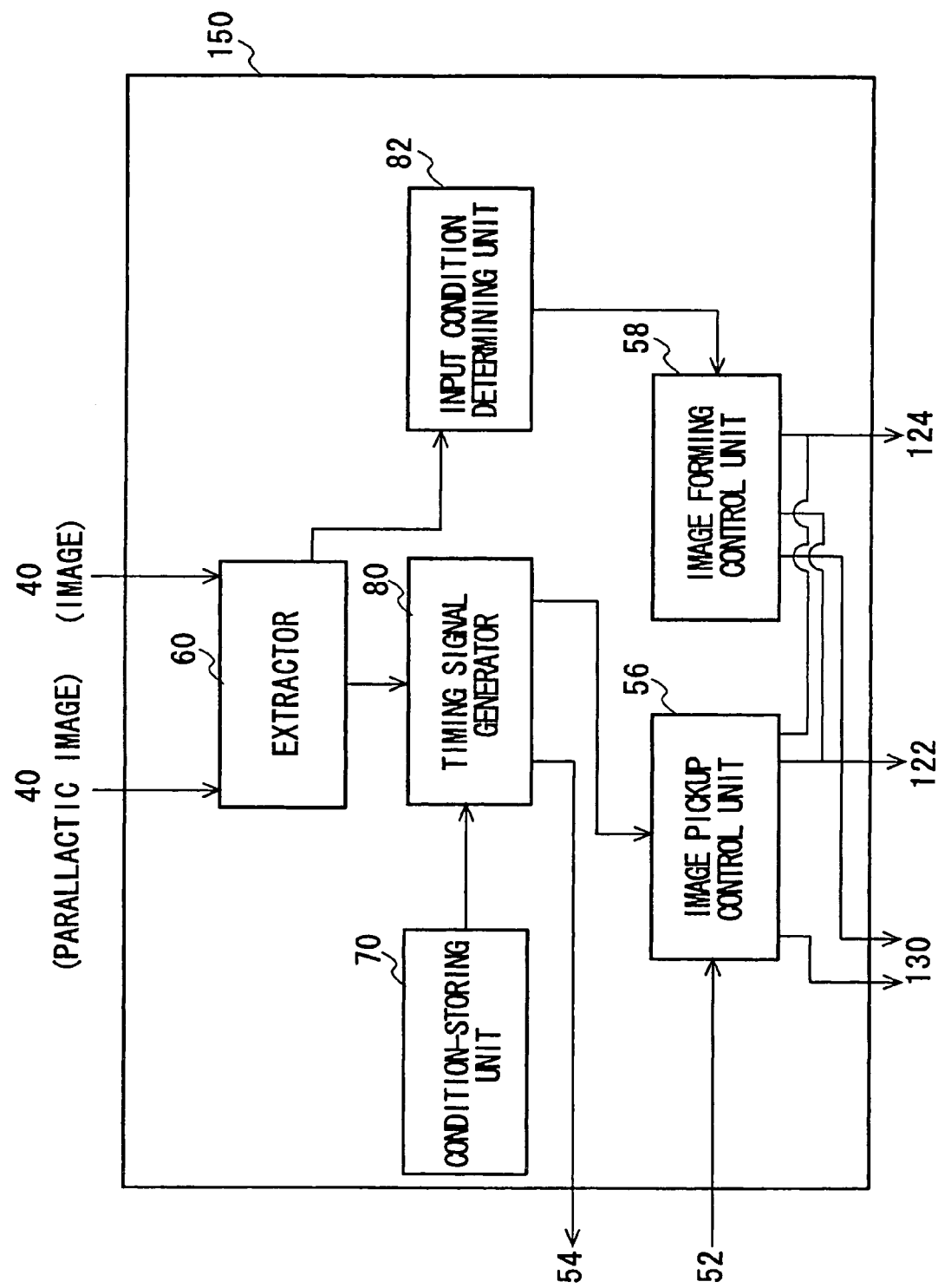
FIG. 12 is a block diagram of the control unit of the second embodiment.

FIG. 12 is a block diagram of the control unit 150 according to the second embodiment. The control unit 150 includes an image pickup control unit 56, an image forming control unit 58, an extractor 60, a condition-storing unit 70, a timing signal generator 80 and an input-condition-determining unit 82. The extractor 60, the condition-storing unit 70, the timing signal generator 80 and the input-condition-determining unit 82 in this embodiment respectively have the same structures and functions as those of the first embodiment, thus the explanation of these parts will be omitted.

The image-forming control unit 58 controls the input unit 120 to form an image of a subject. The image forming control unit 58 controls at least one of the following conditions of the input unit 120: focus condition of the lens 132, aperture condition of the lens stop 134 and exposure time of the shutter 136, based on the input condition determined by the input-condition-determining unit 82. The image-pickup control unit 56 controls the input unit 120 to photograph an image of a subject. The image-pickup control unit 56 also controls the photographing unit 138 to photograph a refined image, based on the input condition.

In this embodiment, the camera 110 includes the raw image data input unit 124 for inputting an electronic raw image in addition to the image data input unit 130 for inputting a refined image. Therefore, the camera can automatically set an optimum condition for photographing a refined image of the subject. Thus, the desired refined image can be obtained without photographing a plurality of images using silver halide films, which can be expensive.

A camera of the third embodiment according to the present invention will be explained in the following. The camera of this embodiment has the same structure as that of the first embodiment explained with reference to FIG. 1. The camera of the third embodiment continuously photographs raw images of a subject. The camera then photographs a refined image, in accordance with a predetermined input condition, at the timing when the previously photographed raw image satisfies a predetermined photographing condition. The camera 110 may have a switch, not shown in the drawings, for selecting an automatic photographing mode in which the best timing for photographing the image is automatically determined, and a manual photographing mode in which the user of the camera 110 determines the best timing.

The camera of this embodiment has the same structure as that of the first embodiment and includes an input unit 20, an A/D converter 30, a memory 40, a control unit 50, a release button 52, an alarm 54, a recording unit 90 and an output unit 92. The camera of this embodiment may be, for example, a digital still camera or a digital video camera that can photograph a still image.

Figure 13:
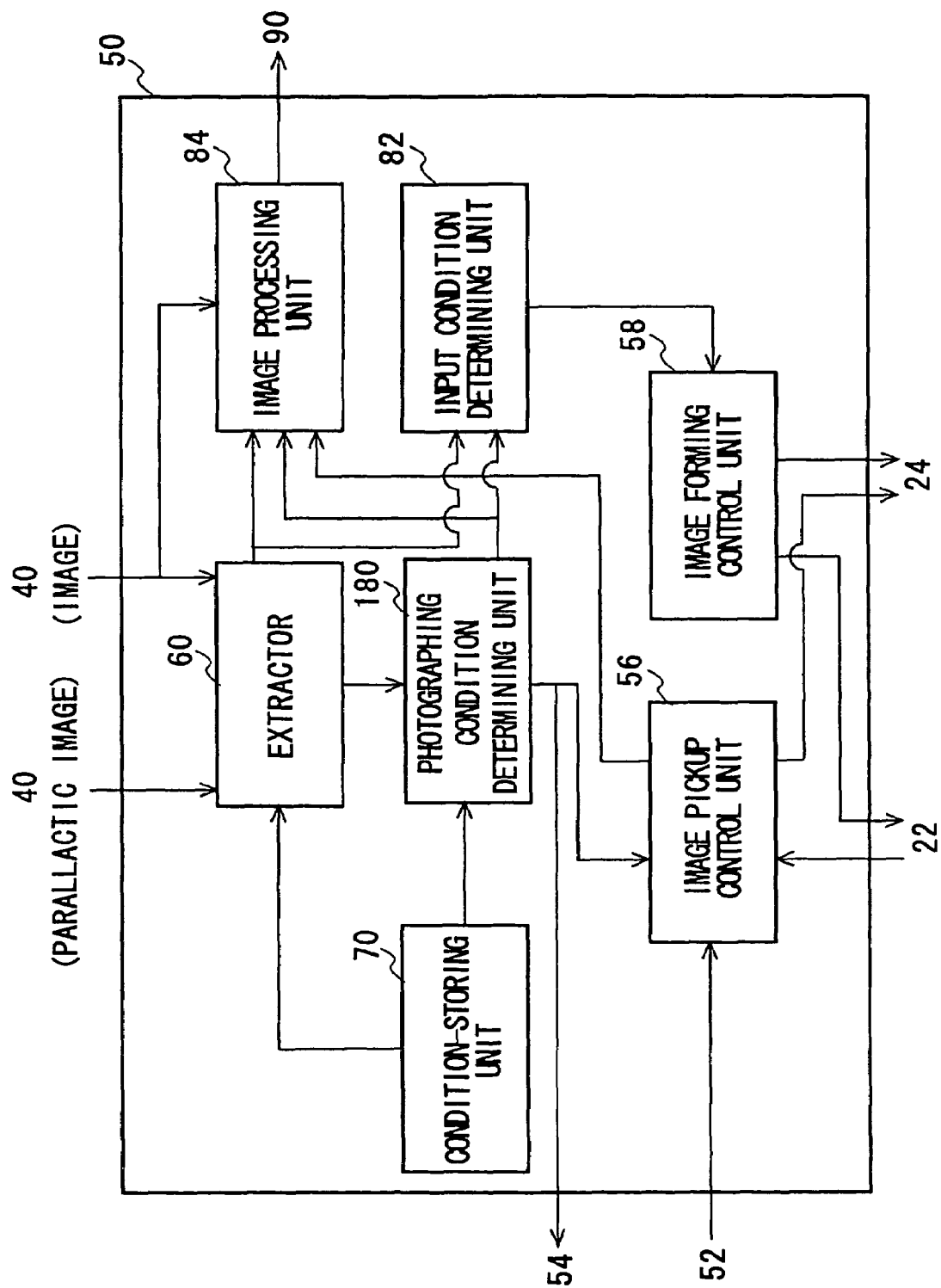
FIG. 13 is a block diagram of the control unit of the third embodiment.

FIG. 13 is a block diagram of the control unit 50 according to the third embodiment. The control unit 50 includes an image-pickup control unit 56, an image-forming control unit 58, an extractor 60, a condition-storing unit 70, a photographing condition judging unit 180, an input-condition determining unit 82, and an image-processing unit 84.

The extractor 60 receives a parallactic image photographed by the parallactic image data input unit 22 and a normal image photographed by the image data input unit 24, from the memory 40. The normal image includes a raw image and a refined image. The extractor 60 extracts an aimed object from the normal image based on the information obtained from the parallactic image and the normal image. The information includes image information of the normal image and depth information of the parallactic image. The extractor 60 outputs data for the aimed object to the input-condition-determining unit 82 and to the image-processing unit 84.

As described above, cameras are usually used to photograph human beings. Therefore, the best timing for photographing a refined image may be determined by the condition of a targeted person. Therefore, it is assumed that the extractor 60 extracts a face part of the targeted person as the aimed object in this embodiment.

The extractor 60 then detects a judgement location from the aimed object based on the information obtained from the parallactic images and the normal images. It is also assumed that the extractor 60 detects shapes or colors of the eyes or the mouth of the targeted person as the judgement location in this embodiment.

The condition-storing unit 70 stores predetermined photographing conditions related to the judgement location, which should be included in each of the raw images obtained by photographing the subject. The condition-storing unit 70 may store a plurality of photographing conditions. The condition-storing unit 70 may include a condition-setting unit, not shown in the drawings, by which a user can select at least one of the photographing conditions from among a plurality of photographing conditions.

The best timing for photographing a refined image may be, for example, the timing when the targeted person does a predetermined motion. This means that the best timing may be the timing when the aimed object of the targeted person shows a predetermined variation. The predetermined variation may be, for example, "the person opens his/her eyes after he/she has been closing his/her eyes for more than two seconds" or "the person's vision of sight follows a predetermined trail". The condition storing unit 70 stores these conditions as the photographing conditions.

The photographing condition judging unit 180 outputs a timing signal for photographing an image. The photographing condition judging unit 180 outputs the timing signal when the judgement location detected by the extractor 60 shows a predetermined motion that satisfies the predetermined photographing condition stored in the storing unit 70.

The input-condition-determining unit 82 determines an input condition for inputting an image based on the information for an aimed object or the judgement location received from the extractor 60. The input-condition-determining unit 82 outputs the input condition to the image forming control unit 58. The input condition may be, for example, focus condition of the lens 25 such that the aimed object including the judgement location is focussed. As the input unit 20 inputs an image in accordance with the input condition such as the focus condition of the lens 25, determined by the input-condition-determining unit 82, the camera of this embodiment can photograph a refined image in which the subject is in good condition.

The image-forming control unit 58 controls the input unit 20 to form a refined image of the subject based on the input condition determined by the condition-determining unit 82. This means that the image-forming control unit 58 controls at least one of the conditions including focus condition of the lens 25, aperture condition of the lens stop 26, exposure time of the shutter 27, and condition of the parallactic shutter 34, based on the input condition.

The image pickup control unit 56 controls the input unit 20, to photograph a refined image of the subject based on the input condition determined by the condition-determining unit 82. This means that the image-pickup control unit 56 controls at least one of the conditions including output signal of the CCD 29 and output signal of the parallactic CCD 36, based on the input condition. The image-pickup control unit 56 controls the input unit 20, to photograph a refined image based on the timing signal output from the photographing condition judging unit 180. The image-pickup control unit 56 controls the image-processing unit 84 to process the refined image.

The image-processing unit 84 receives the refined image photographed by the image data input unit 24 from the memory 40. The image-processing unit 84 then processes the refined image based on the information for the aimed object or the judgement location extracted from the extractor 60. The refined image is processed in accordance with the process conditions as explained in the first embodiment.

Figure 14:
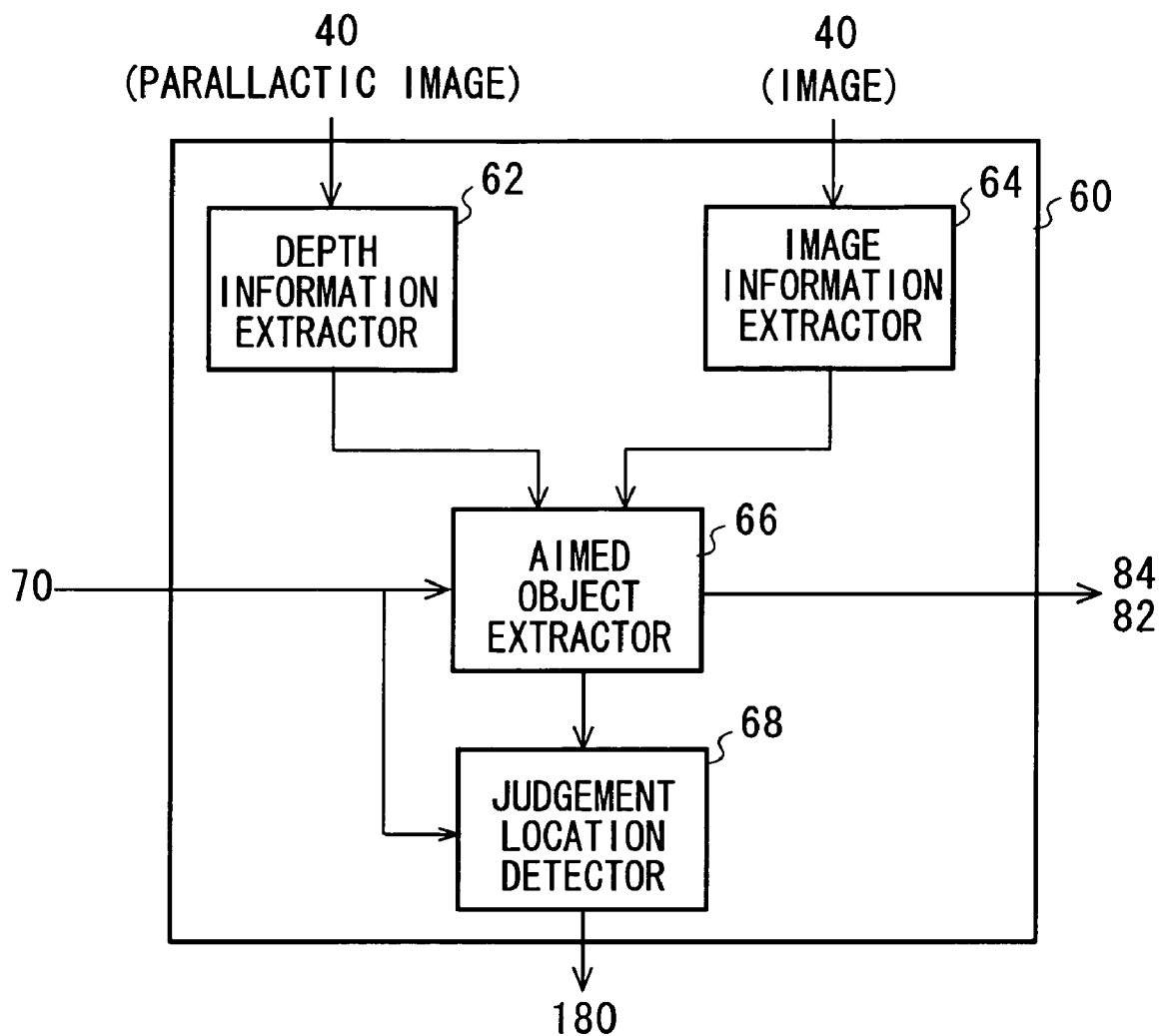
FIG. 14 is a block diagram of the function of the extractor 60.

FIG. 14 is a functional block diagram of the extractor 60. The extractor 60 includes a depth information extractor 62, an image information extractor 64, an aimed object extractor 66 and a judgement location detector 68.

The depth information extractor 62 extracts the depth information indicating the distance to each of components of the subject, based on the data of the parallactic image received from the memory 40.

The image information extractor 64 extracts the image information for normal images, from the data for the normal images received from the memory 40. The image information includes, for example, data of the normal image such as luminescence distribution, intensity distribution, color distribution, texture distribution, and motion distribution.

The aimed object extractor 66 extracts data for the face area of the person as the aimed object, based on the depth information and the image information. The aimed object is extracted in a similar manner as that explained in the first embodiment.

The aimed object extractor 66 outputs the information for the aimed object to the input-condition-determining unit 82 and the image-processing unit 84.

As described above, the aimed object extractor 66 extracts an aimed object based on the depth information in addition to the image information. Therefore, even when a plurality of people are photographed in the image and their faces are close to each other, the faces of the different people can be distinctly extracted.

The judgement location detector 68 detects the judgement location from the data for the aimed object extracted by the aimed object extractor 66. The judgement location is detected in accordance with a detecting condition different from the extracting condition for extracting the aimed object by the aimed object extractor 66. In this embodiment, the judgement location is eyes or mouth of the photographed person. Therefore, the judgement location detector 68 detects the eyes and mouth from the face area.

The judgement location detector 68 outputs the information for the judgement location to the photographing condition judging unit 180.

Figure 15:
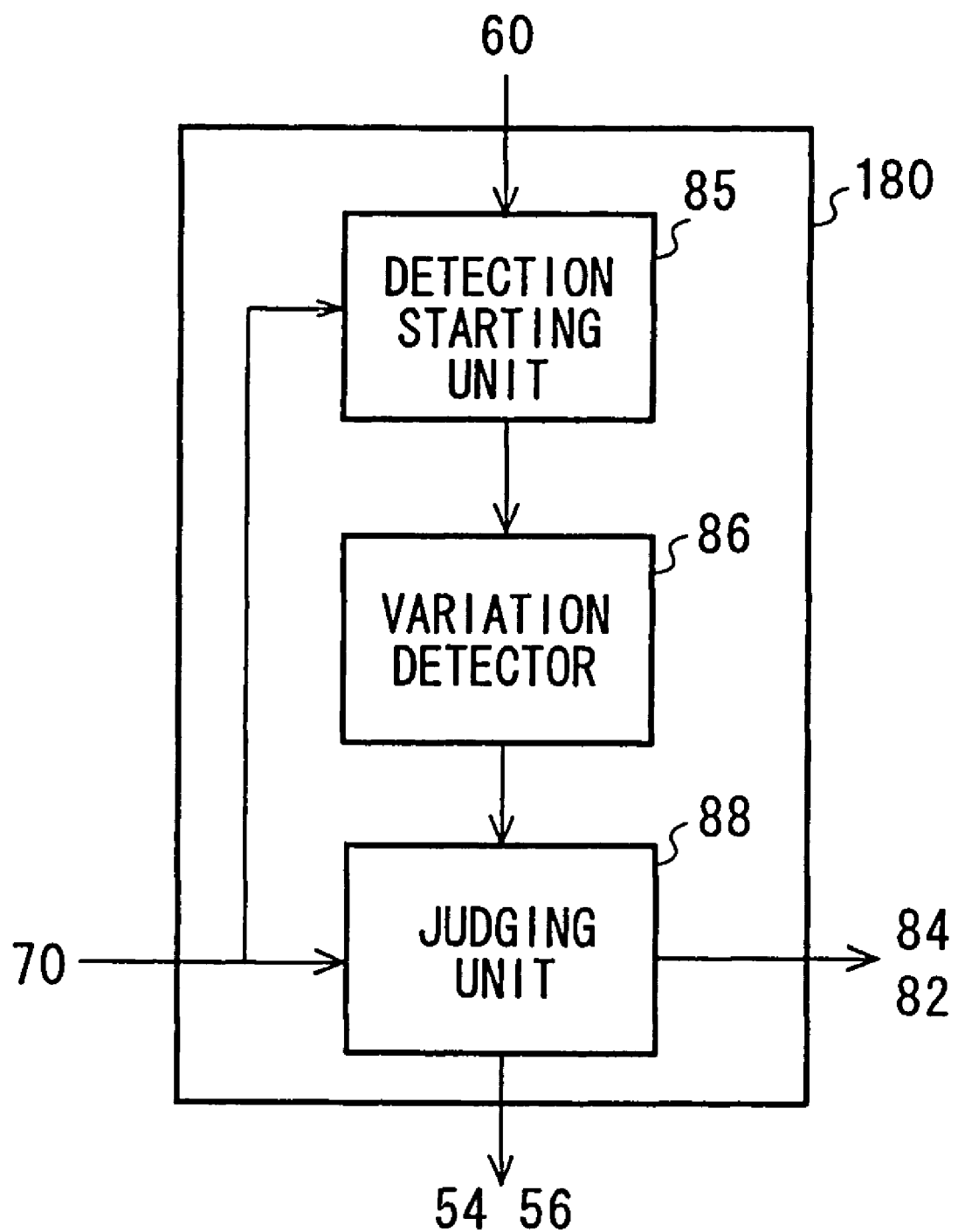
FIG. 15 is a block diagram of the function of the photographing condition judging unit.

FIG. 15 is a block diagram of the function of the photographing condition judging unit 180. The photographing condition judging unit 180 includes a detection-starting unit 85, a variation detector 86 and a judging unit 88. The photographing condition includes a predetermined photographing condition related to the motion of the judgement location of the aimed object, and the starting condition for starting detection of the motion of the judgement location.

The detection-starting unit 85 outputs a starting signal when the judgement location detected by the extractor 60 satisfies a predetermined starting condition. The variation detector 86 starts detecting variation in the motion of the judgement location upon receiving the starting signal from the detection-starting unit 85. The judging unit 88 outputs the timing signal for photographing a refined image when the variation of the motion of the judgement location detected by the variation detector 86 satisfies a predetermined photographing condition.

The photographing conditions may be, for example, "the person opens his/her eyes after he/she has been closing his/her eyes for more than two seconds" or "the person's vision of sight follows a predetermined trail". It is desirable that the photographing conditions are motions or variations of the targeted person, which the targeted person usually does not perform in front of the camera, in order to avoid misjudgment.

Each of the photographing conditions has a reference situation for the judgement location, which should meet the requirements of the photographing condition. The condition-storing unit 70 also stores the reference situations for the judgement location, each respectively corresponding to each of the photographing conditions. The reference situations for the judgement location corresponding to each of the photographing conditions will be described in the following.

For the conditions such as "the person is not blinking", and "the person is looking at the camera", the reference situation may relate to shape of the eye, color of the eye, and size of the eye. Whether each of the judgement locations satisfies each of these reference situations or not is judged in accordance with predetermined algorithms based on experience.

When the photographing condition "the person opens his/her eyes after he/she has been closing his/her eyes for more than two seconds" is selected, the judgement location may be the eye of the person. The reference situation for the eye in this photographing condition will be determined as follows. When a person blinks, his/her eyelid hides his/her eyeball. While he/she is blinking and his/her eye is partially closed, a white part of his/her eyeball is especially hidden by his/her eyelid. This means that when the person is blinking, the white part of his/her eyeball should be relatively small and when the person is not blinking, the white part of his/her eyeball should be relatively large. Therefore, whether the person opens his/her eyes or not is determined based on the dimension of the white part of his/her eyeball.

The starting condition for the photographing condition "the person opens his/her eyes after he/she has been closing his/her eyes for more than two seconds" becomes "the person closes his/her eyes". The detection-starting unit 85 outputs a starting signal when it detects the closed eye of the person. The variation detector 86 starts detecting variation of the eye upon receiving the starting signal. The variation detector 86 counts the period while the person keeps his/her eyes closed, from the data for the raw images continuously input. The variation detector 86 outputs the timing signal when the person opens his/her eyes after he/she has had his/her eyes closed for more than two seconds. It is desirable for the variation detector 86 to output the timing signal one second after the person opens his/her eyes rather than the moment when the person opens his/her eyes.

When the photographing condition "the person's vision of sight follows a predetermined trail" is selected, the judgement location may be the eye of the person. The reference situation for the eye in this photographing condition will be determined as follows. The trail of the person's vision of sight can be detected by detecting the normal vector of the iris in the eye. At first, the iris of his/her eye is recognized, from his/her eye detected by the judgement location detector 68, as being a cylindrical or elliptic area whose circumference has a brownish or blue/green color. The center of the iris is then detected based on the image information for the eye. The normal vector of the center of the iris is obtained based on the depth information.

It is assumed in this photographing condition that the predetermined trail of the vision of sight is "the person looks upper left with respect to the camera, lower right with respect to the camera and then at the camera", for example. The starting condition in this case becomes "the person looks to the upper left with respect to the camera". The detection starting unit 85 outputs a starting signal when it detects that the person is looking to the upper left with respect to the camera. The variation detector 86 starts detecting variation of the vision of sight of the person upon receiving the starting signal. The variation detector 86 detects the trail of the vision of sight based on the data for the plurality of input raw images. The judgement unit 88 outputs the timing signal when the trail is "upper left, lower right and then at the camera".

The control unit 50 extracts the face part based on the data for the raw image and the information thereof and then detects the judgement location from the information for the extracted face part. The control unit 50 then detects the variation of the judgement location and determines the timing for photographing when the detected judgement location satisfies the photographing condition. Therefore, the camera of this embodiment can automatically photograph at a timing when the targeted person is in good condition.

The method of generating a timing signal when a plurality of people is photographed will be explained next.

When each of the images includes a plurality of people, the judgement location detector 68 detects the judgement locations for each of the people. This means that the aimed object extractor 66 extracts the face parts for each of the people from each of the images. The judgement location extractor 68 detects the eyes or the mouth for each of the people from each of the images.

At this time, the variation detector 86 detects the variation of the judgement locations for each of the people. The judging unit 88 outputs the timing signal when the variation of the plurality of judgement locations satisfy the photographing condition. The judging unit 88 selects the aimed objects respectively, including the judgement locations whose variation satisfies the photographing condition. The judging unit 88 then outputs the information of the aimed objects including the selected judgement locations to the input-condition-determining unit 82 and the image-processing unit 84.

The method of photographing an image in this embodiment is almost same as that of the first embodiment shown in FIGS. 4 and 5.

Figure 16:
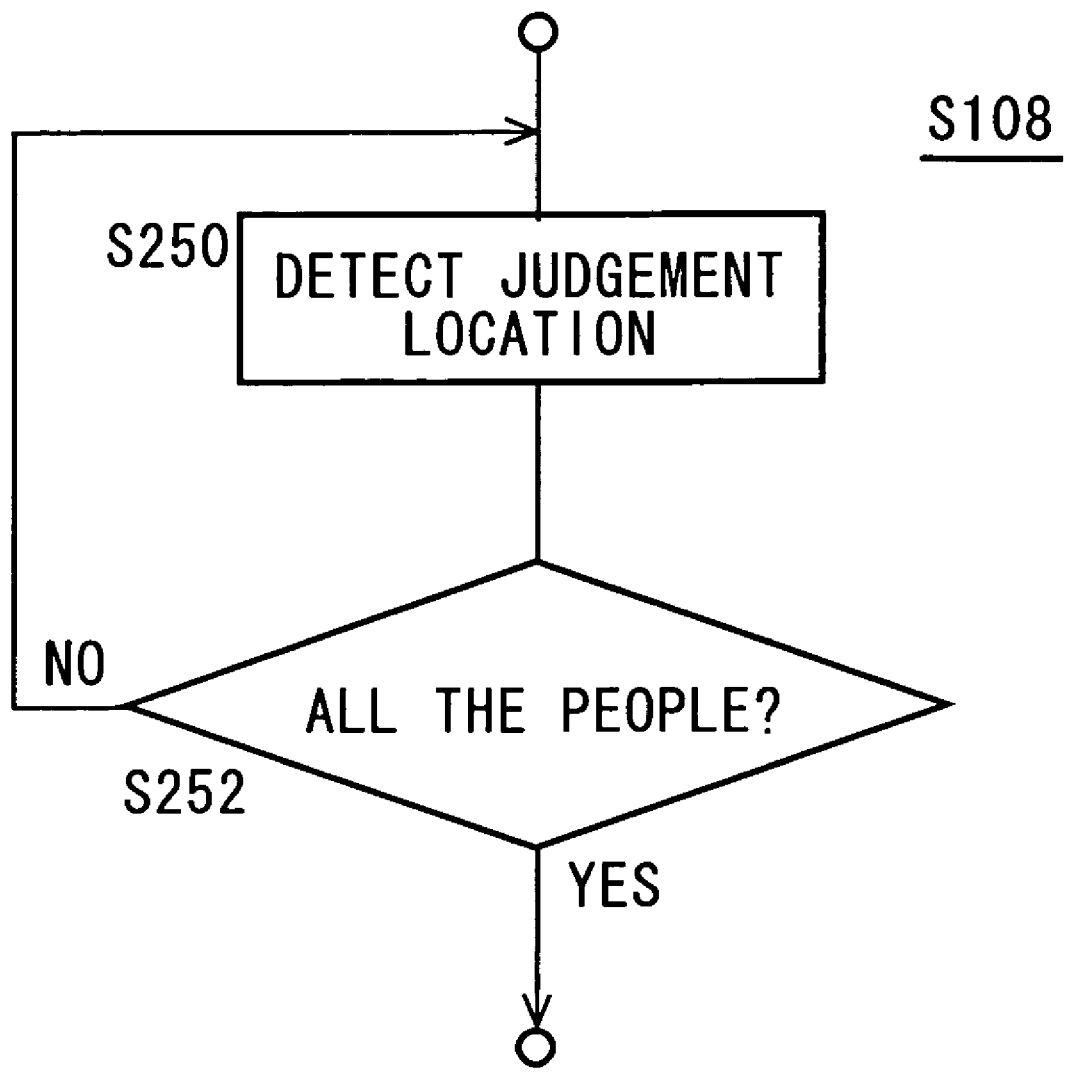
FIG. 16 is a flowchart showing in detail the method of detecting a judgement location, step 108 in FIG. 4.

FIG. 16 is a flowchart showing in detail the method of detecting a judgement location, step 108 in FIG. 4. The judgement location detector 68 detects the judgement location based on the image information for the face part (S250). When each of the images includes a plurality of people, the judgement location detector 68 detects the judgement locations for all of the people (S252 and S250).

Figure 17:
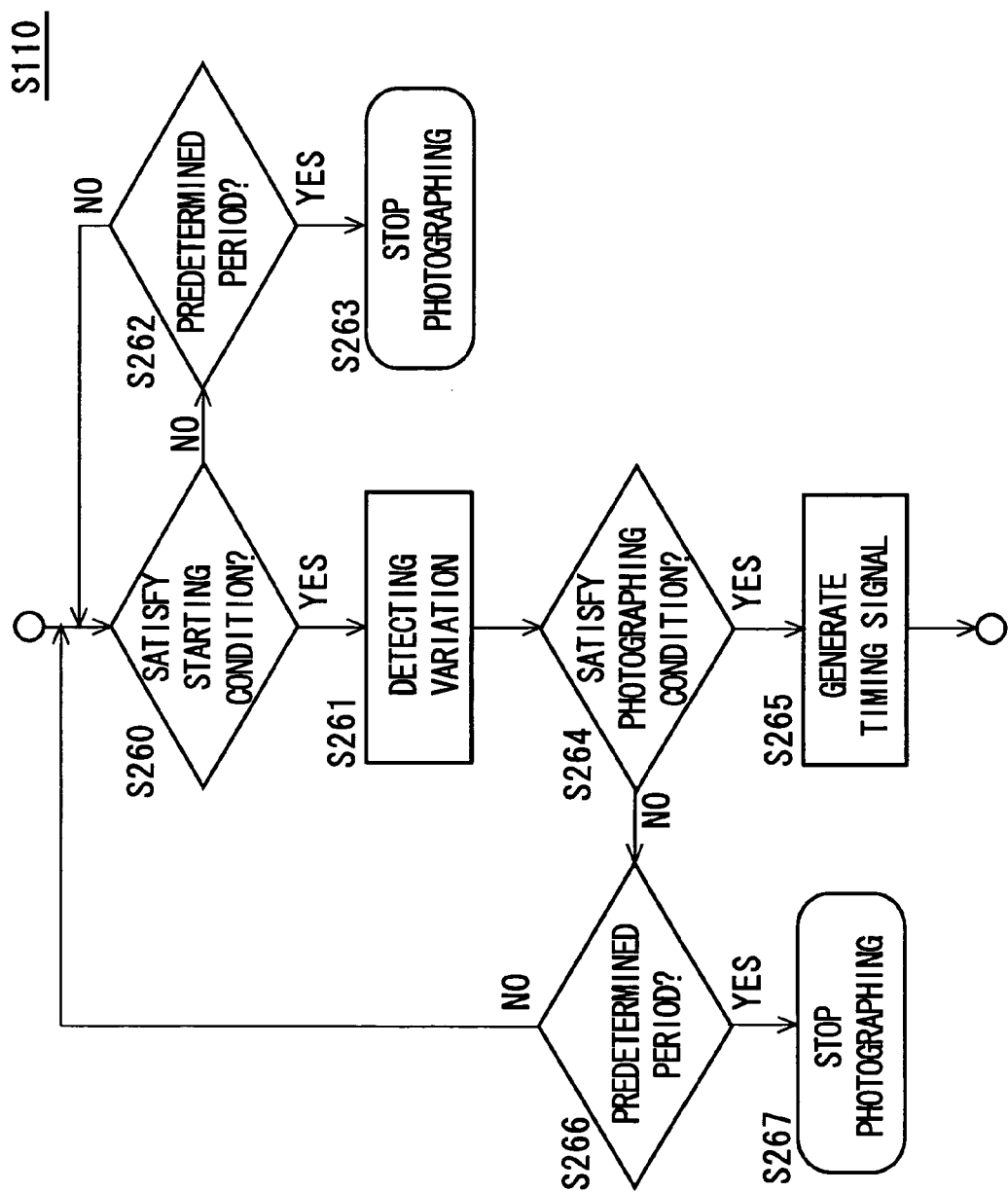
FIG. 17 is a flowchart showing in detail the method of generating a timing signal, step 110 in FIG. 4.

FIG. 17 is a flowchart showing in detail the method of generating a timing signal, step 110 in FIG. 4. The detection starting unit 85 judges whether or not the judgement location detected by the judgement location detector 68 satisfies the starting condition (S260). The detection-starting unit 85 continues judging whether or not the judgement location satisfies the starting condition for a predetermined period (S260 and S262). The variation detector 86 starts detecting the variation of the judgement location when the judgement location satisfies the starting condition (S261). The image-pickup control unit 56 controls the input unit 20 to stop photographing raw images when the judgement location does not satisfy the predetermined starting condition for a predetermined period (S262 and S263).

The judging unit 88 then judges whether the variation of the judgement location satisfies the photographing condition or not (S264). The timing signal generator 180 generates a timing signal when the variation of the judgement location satisfies the photographing condition (S265). When the variation of the judgement location does not satisfy the photographing condition, the process returns to step S260 if the predetermined period is remaining. Then, the detection starting unit 85 judges again whether or not the judgement location detected by the judgement location detector 68 satisfies the starting condition (S260). The image pickup control unit 56 controls the input unit 20 to stop photographing raw images when the predetermined period is expired (S266 and S267).

Figure 18:
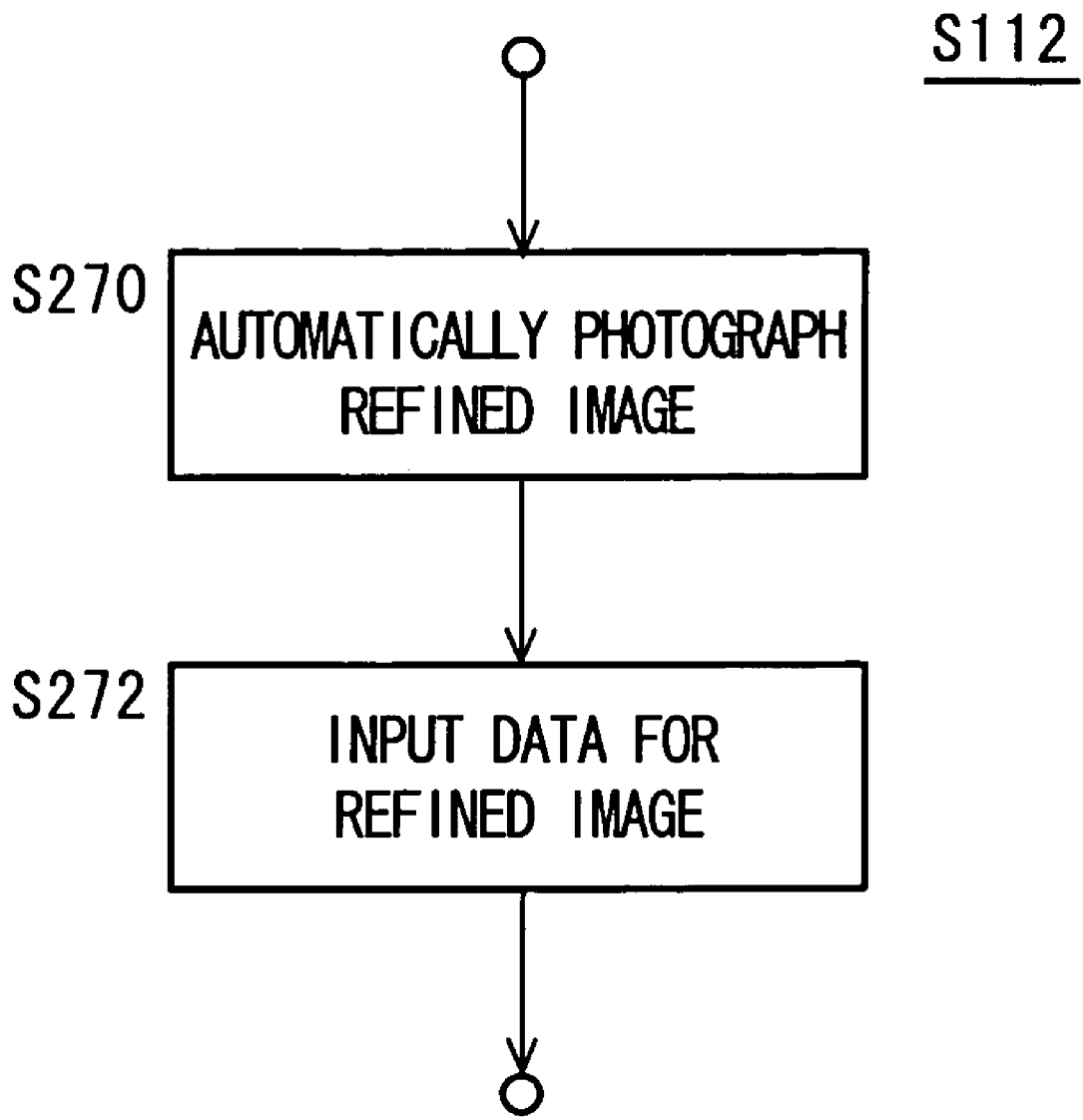
FIG. 18 is a flowchart showing in detail the method of photographing a refined image, step 112 in FIG. 4.

FIG. 18 is a flowchart showing in detail the method of photographing a refined image, step 112 in FIG. 4. The image-pickup control unit 56 controls the input unit 20 to automatically photograph a refined image based on the timing signal output at the step 110 in FIG. 4 (S270). The input unit 20 inputs the data for the refined image (S272).

At the step 112 in FIG. 4, the camera 10 may not automatically photograph a refined image but the user of the camera 10 may press the release button 52 to photographing the refined image upon receiving the alarm signal from the alarm 54.

The method of manually photographing a refined image by the user of the camera 10 is in accordance with the flowchart shown in FIG. 9, which is explained in the first embodiment. The alarm 54 outputs an alarm signal such as an alarm sound or an alarm light based on the timing signal generated at the step 110 (S190). When the user, or the photographer of the camera 10 notices the alarm signal, and then he/she presses the release button 52 (S192), the camera 10 photographs a refined image (S194).

As the alarm 54 outputs the alarm sound or the alarm light based on the timing signal, the user can photograph a refined image at an optimum timing without having to judge the timing himself. Furthermore, the targeted person can also notice the timing because of the alarm sound or the alarm light.

The alarm 54 may output an alarm signal such as an alarm sound or an alarm light when the timing signal is not output from the timing signal generator for a predetermined period.

Figure 19:
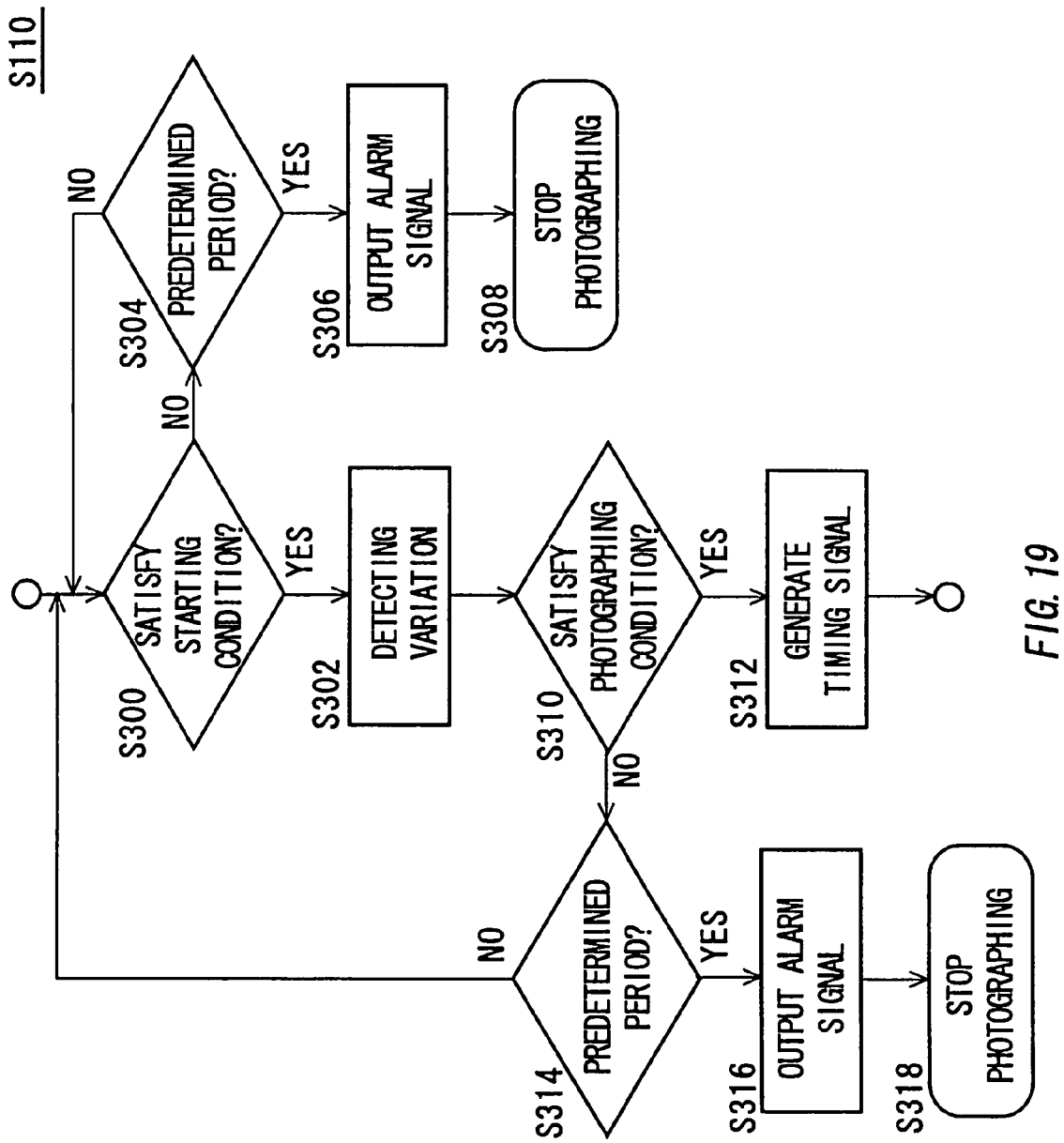
FIG. 19 is a flowchart showing in detail the method of generating a timing signal, step 110 in FIG. 4.

FIG. 19 is a flowchart showing in detail the method of generating a timing signal in which the alarm 54 outputs the alarm signal, step 110 in FIG. 4. The detection-starting unit 85 judges whether or not the judgement location detected by the judgement location detector 68 satisfies the starting condition (S300). The detection starting unit 85 continues judging whether or not the judgement location satisfies the starting condition for a predetermined period (S300 and S304). The variation detector 86 starts detecting the variation of the judgement location when the judgement location satisfies the starting condition (S302). The alarm 54 outputs an alarm signal such as an alarm sound and an alarm light when the photographing condition judging unit 180 does not output the timing signal for a predetermined period (S304 and S306). Then, the image-pickup control unit 56 controls the input unit 20 to stop photographing raw images, when the judgement location does not satisfy the predetermined starting condition for a predetermined period (S308).

The judging unit 88 then judges whether or not the variation of the judgement location satisfies the photographing condition (S310). The timing signal generator 80 generates a timing signal when the variation of the judgement location satisfies the photographing condition (S312). When the variation of the judgement location does not satisfy the photographing condition, the process returns to the step S314 if the predetermined period is not remaining. Then, the detection starting unit 85 judges again whether or not the judgement location detected by the judgement location detector 68 satisfies the starting condition (S314 and S300). At the step S314, the alarm 54 outputs an alarm signal such as an alarm sound and an alarm light when the predetermined period is expired (S316). The image-pickup control unit 56 controls the input unit 20 to stop photographing raw images (S318).

As the alarm 54 outputs the alarm signal such as the alarm sound and the alarm light when the timing signal is not output within a predetermined period, the photographer and the targeted person become aware of the fact that the targeted person does not meet the photographing condition because of the sound and the light.

The camera of the fourth embodiment will be explained in the following. The camera of this embodiment is a silver halide type camera by which an image of a subject is formed on a silver halide film and has the same structure as that explained in the second embodiment shown in FIG. 11. Therefore, the explanation of the structure of the camera in this embodiment will be omitted.

Figure 20:
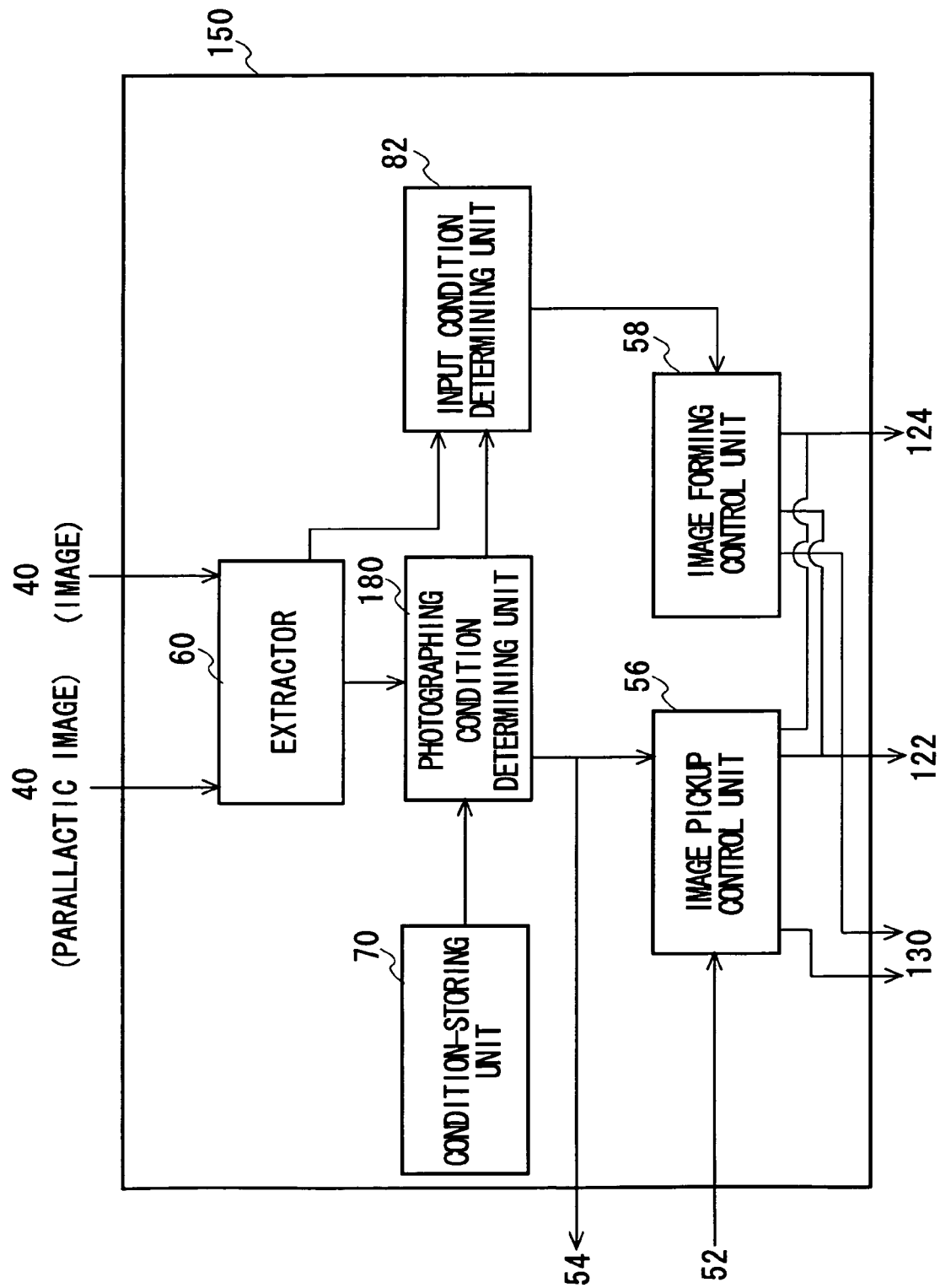
FIG. 20 is a block diagram of the control unit of the fourth embodiment.

FIG. 20 is a block diagram of the control unit 150 in this embodiment. The control unit 150 in this embodiment includes an image pickup control unit 56, an image forming control unit 58, an extractor 60, a condition storing unit 70, a photographing condition judging unit 180, an input-condition-determining unit 82. The extractor 60, the condition storing unit 70, the photographing condition judging unit 180 and the input-condition-determining unit 82 in this embodiment respectively have same the structures and functions as those explained in the first embodiment, therefore, the explanation of these parts will be omitted.

The image-forming control unit 58 controls the input unit 120 to form an image of a subject. The image-forming control unit 58 controls at least one of the following conditions of the input unit 120: focus condition of the lens 132, aperture condition of the lens stop 134 and exposure time of the shutter 136, based on the input condition determined by the input-condition-determining unit 82. The image pickup control unit 56 controls the input unit 120 to photograph an image of a subject. The image pickup control unit 56 also controls the photographing unit 138 to photograph a refined image based on the input condition.

In this embodiment, the camera 110 includes the raw image data input unit 124 for inputting an electronic raw image, in addition to the image data input unit 130 for inputting a refined image. Therefore, the camera can automatically set an optimum condition for photographing a refined image of the subject. Thus, a desired refined image can be obtained without photographing a plurality of images using silver halide films, which can be expensive.

A camera of the fifth embodiment according to the present invention will be explained in the following. The camera of this embodiment continuously photographs images of a subject. The camera outputs a timing signal when the targeted subject in the image satisfies the photographing condition. Upon receiving the timing signal, the camera of this embodiment records one of the images, which was photographed at a predetermined earlier period than the timing signal, based on the timing signal, as a refined image.

The camera of this embodiment includes a control unit 50. The structure of the camera of this embodiment other than the control unit 50 is the same as that explained in the first to fourth embodiments. Thus, the explanation of same parts will be omitted.

Figure 21:
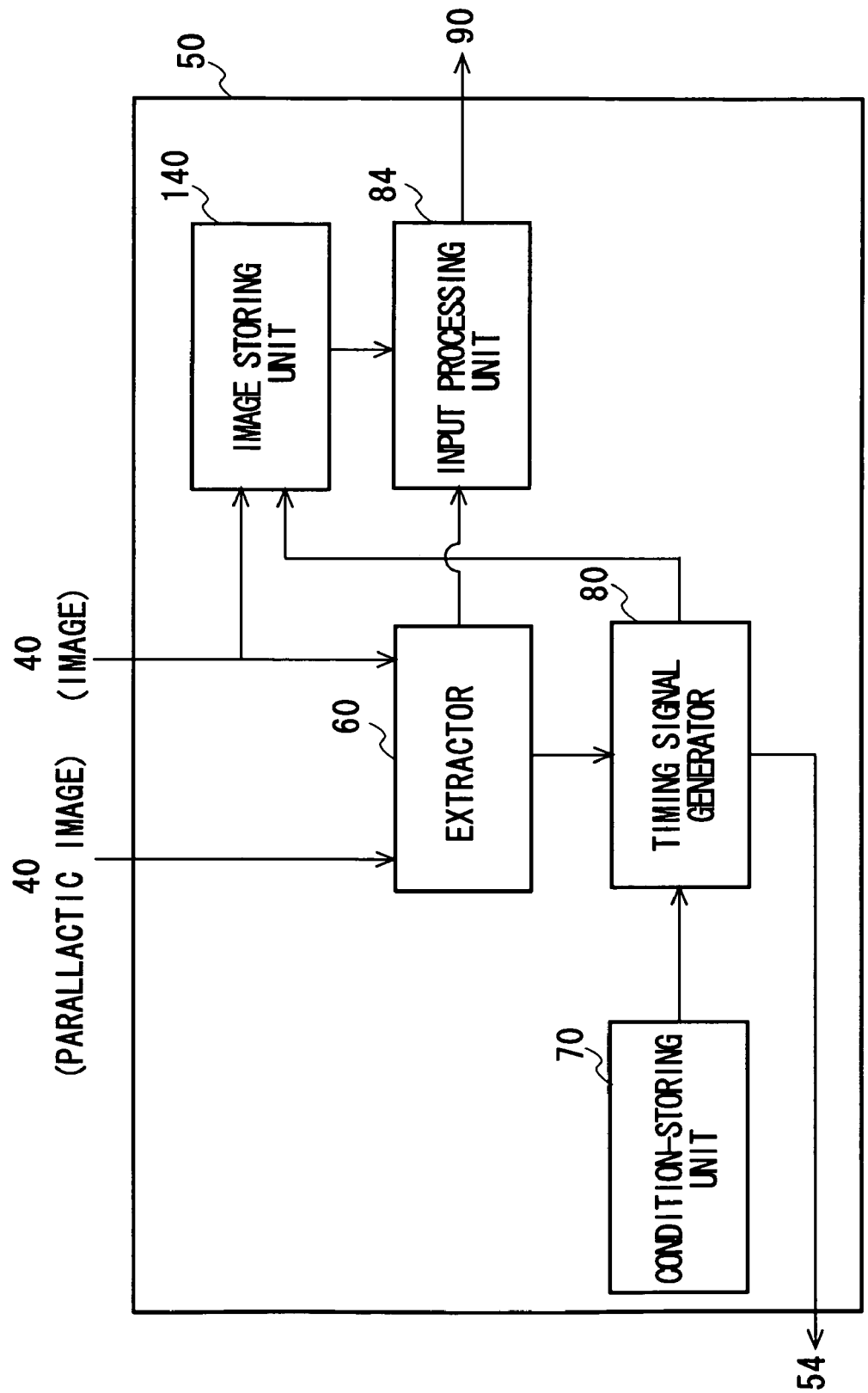
FIG. 21 is a block diagram of the control unit of the fifth embodiment.

FIG. 21 is a block diagram of the control unit 50 according to the fourth embodiment. The control unit 50 includes an extractor 60, a condition-storing unit 70, a timing signal generator 80, an image processing unit 84, and a image storing unit 140. The extractor 60, the condition-storing unit 70, the timing signal generator 80 and the image processing unit 84 are the same as those explained in the first to fourth embodiments. Although only the timing signal generator 80 is shown in FIG. 21, the part having the numeral 80 may be the photographing condition judging unit explained in the third and the fourth embodiments.

The image storing unit 140 temporarily stores the images photographed by the image data input unit 24 and input from the memory 40. Each of the images is respectively stored with time records of when the image was photographed. The image storing unit 140 receives the timing signal from the timing signal generator 80 and then outputs one of the raw images photographed at a timing earlier than the timing signal by a predetermined period as the refined image, to the image processing unit 84. The image processing unit 84 processes the refined image based on the information for the extractor 60.

Figure 22:
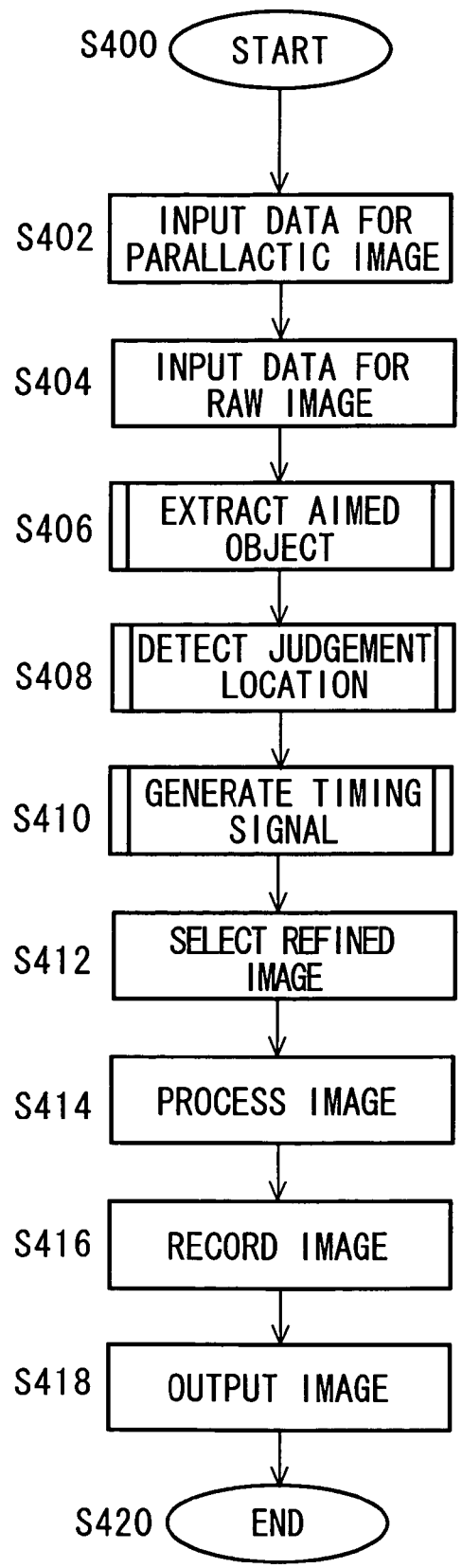
FIG. 22 is a flowchart showing a method of photographing an image.

FIG. 22 is a flowchart showing a method of photographing an image. The camera starts photographing the subject when the release button 52 is pressed (S400). When the camera starts photographing, data for a parallactic image is input from the parallactic image data input unit 22 (S402). At the same time, data for raw images are continuously input from the image data input unit 24 (S404). The raw images are temporarily stored in the image storing unit 140. Then, the aimed object extractor 66 extracts the face part of the targeted person as the aimed object (S406). The judgement location detector 68 detects the judgement location based on the image information for the face part (S408). The photographing condition judging unit 180 generates and outputs a timing signal when the judgement location satisfies a predetermined photographing condition (S410). Upon receiving the timing signal, the image storing unit 140 selects one of the raw images photographed at a timing earlier than the timing signal by a predetermined period, as the refined image. The image storing unit 140 outputs the refined image to the image-processing unit 84 (S412).

The image-processing unit 84 processes the refined image (S414). The processing of the refined image may include compositing a plurality of refined images and the like. The recording unit 90 records the processed image on a recording medium (S416). The output unit 92 outputs the processed image (S418), and the photographing operation is terminated (S420).

The detailed operations of the steps 406, 408 and 410 are the same as those explained in the previous embodiments. Thus, an explanation of these steps will be omitted.

The image storing unit 140 may store all of the raw images which are photographed from a timing earlier than the timing signal by a predetermined period to the timing of the timing signal, as the refined images. In this case, the image-processing unit 84 processes the plurality of refined images.

As described above, the camera stores the raw image which is photographed at a timing earlier than the timing signal by a predetermined period as the refined image, based on the timing signal. Therefore, the refined image is selected by considering the delay time, even when the extractor 60 takes a certain time for extracting the aimed object and detecting the judgement location. Thus, an image in which the targeted person has a good appearance can be obtained.

Furthermore, the camera stores all of the raw images which are photographed from a timing earlier than the timing signal by a predetermined period to the timing of the timing signal, as the refined images. Therefore, an image in which the targeted person has a good appearance can be selected.

Figure 23:
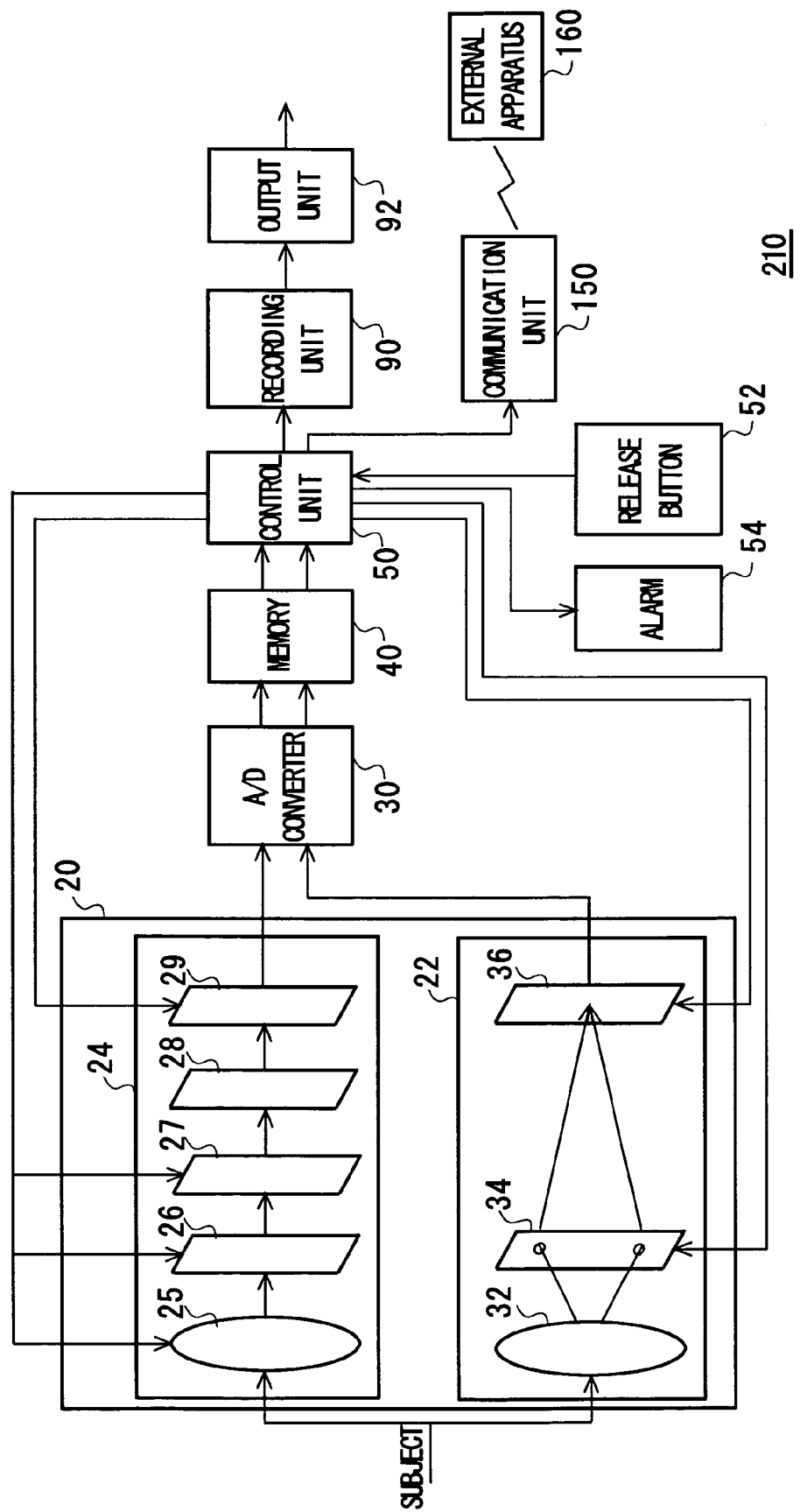
FIG. 23 shows a camera of the sixth embodiment.

FIG. 23 shows a camera 210 of the sixth embodiment according to the present invention. The camera 210 of this embodiment continuously photographs a plurality of raw images of a subject in the same way as the first to fifth embodiments. The camera 210 outputs a timing signal when the raw image satisfies the photographing condition.

The camera 210 of this embodiment has the same structure as that of the first embodiment and further includes a communication unit 150. The camera 210 outputs the timing signal through the communication unit 150, to control operation of an external apparatus 160 based on the timing signal. The communication unit 150 of the camera 210 sends the timing signal to the external apparatus 160 by a wireless means. The communication unit 150 of the camera 210 and the external apparatus may be held in communication with each other by a wireless means such as via a radio or infrared radiation or by cables such as via a USB or a LAN. The external apparatus 160 may be, for example, a camera for photographing a refined image of the target, or an illuminator.

In this embodiment, the camera 210 continuously photographs raw images of a subject. The camera 210 outputs a timing signal when the raw image satisfies a predetermined selecting condition. The timing signal is transferred from the camera 210 to the external apparatus 160 through the communication unit 150 of the camera 210. When the external apparatus 160 is another camera for photographing a refined image, the external apparatus photographs a refined image of the subject based on the timing signal from the camera 210.

Using the camera 210 of this embodiment, even a silver halide type camera that does not include a raw image data input unit can photograph a refined image of a subject at the timing when the targeted person is in good condition. Thus, a desired refined image can be obtained without photographing a plurality of images using silver halide films which can be expensive.

As described above, according to the embodiments of the present invention, an image in which a targeted object satisfies a predetermined photographing condition.

Although the present invention has been described by way of exemplary embodiments, it should be understood that many changes and substitutions may be made by those skilled in the art without departing from the spirit and the scope of the present invention which is defined only by the appended claims.

What is claimed is:

1. A camera comprising:
an image data input unit forming an image of a subject for photographing said subject;
a condition storing unit storing a predetermined photographing condition relating to at least one of an expression and characteristic feature of an aimed object in the image of the subject;
an extractor extracting data of said aimed object from said image of said subject based on an extracting condition;
a detecting unit detecting a condition of said aimed object on said image, and said detecting unit detecting a satisfaction of said condition of said aimed object with said predetermined photographing condition; and
a timing signal generator automatically outputting a timing signal when said detecting unit detects the satisfaction of said photographing condition,
wherein said extractor is adapted to identify candidate aimed objects in said image of said subject based on depth information of said image indicating the distance from the camera to parts of said subject,
said photographing condition includes a predetermined condition related to said aimed object and said timing signal generator outputs said timing signal when said aimed object satisfies said photographing condition,
said extractor detects data of a judgement location from said data of said aimed object in said image based on a detecting condition different from said extracting condition,
said photographing condition includes a predetermined photographing condition related to a desirable judgement location, and
said timing signal generator outputs said timing signal when said judgement location satisfies said photographing condition.

2. A camera as set forth in claim 1,
wherein said extractor extracts data of a plurality of said aimed objects from said image; and
said timing signal generator outputs said timing signal when said plurality of aimed objects satisfy said photographing condition.

3. A camera as set forth in claim 2, wherein said timing signal generator outputs said timing signal when the ratio of said aimed objects satisfying said photographing condition against all of said plurality of said aimed object exceeds a predetermined ratio.

4. A camera as set forth in claim 2,
wherein said extractor detects data of a plurality of judgement locations from each of said data of said plurality of aimed objects based on a detecting condition different from said photographing condition,
said photographing condition includes a predetermined photographing condition related to said judgement location, and
said timing signal generator outputs said timing signal when said plurality of said judgement locations satisfy said photographing condition.

5. A camera as set forth in claim 4, wherein said timing signal generator outputs said timing signal when the ratio of said judgement locations satisfying said photographing condition against all of said plurality of said aimed object exceeds a predetermined ratio.

6. A camera as set forth in claim 1, further comprising an image-pickup control unit controlling said input unit for photographing said image based on said timing signal.

7. A camera as set forth in claim 1, further comprising an illuminator illuminating said subject based on said timing signal.

8. A camera as set forth in claim 1, further comprising a recording unit recording said image on a replaceable non-volatile recording medium based on said timing signal.

9. A camera as set forth in claim 1, further comprising an alarm outputting an alarm signal for notifying that said subject satisfies said photographing condition based on said timing signal.

10. A camera as set forth in claim 1,
wherein said photographing condition includes a plurality of photographing conditions, and
said camera further comprises a condition-setting unit previously selecting at least one of said photographing conditions, for photographing said image, from among said plurality of photographing conditions.

11. A camera as set forth in claim 1, further comprising:
an input condition determining unit determining an input condition for inputting said image based on information of said judgement location detected by said extractor; and
an image-forming control unit controlling an input unit for forming said image of said subject based on said input condition.

12. A camera as set forth in claim 1, further comprising an image processing unit processing said image based on information of said judgement location detected by said extractor.

13. A method of photographing an image of a subject comprising:
storing a predetermined photographing condition relating to at least one of an expression and characteristic feature of an aimed object in the image of the subject;

extracting data of said aimed object from said image of said subject based on an extracting condition;

detecting a condition of said aimed object on said image;

automatically detecting a satisfaction of said condition of said aimed object with said predetermined photographing condition; and automatically outputting a timing signal when the satisfaction of said predetermined photographing condition is automatically detected wherein said extracting step identifies at least one candidate aimed object in said image of said subject based on depth information of said image indicating the distance from the camera to parts of said subject, said photographing condition includes a predetermined condition related to said aimed object, said timing signal is output when said aimed object satisfies said photographing condition, said extracting includes detecting data of a judgement location from said data of said aimed object in said image based on a detecting condition different from said extracting condition, said photographing condition includes a predetermined photographing condition related to a desirable judgement location, and said timing signal is output when said judgement location satisfies said photographing condition.

14. A method as set forth in claim 13, further comprising photographing said subject based on said timing signal.

15. A method as set forth in claim 13, further comprising recording said photographed image of said subject on a replaceable nonvolatile recording medium based on said timing signal.

16. A method as set forth in claim 13, further comprising:

determining an input condition for inputting said image based on information for said judgement location detected in said detecting step; and forming said image of said subject based on said input condition.

17. A method as set forth in claim 13, further comprising processing said image based on information for said judgement location detected in said detecting step.

* * * * *